US012737709B2

(12) United States Patent
White et al.

(10) Patent No.: US 12,737,709 B2
(45) Date of Patent: Sep. 15, 2026

(54) SYSTEMS AND METHODS FOR MONITORING INFORMATION SECURITY EFFECTIVENESS

(71) Applicant: RiskRecon Inc., Purchase, NY (US)

(72) Inventors: Kelly Thomas White, Park City, UT (US); Michael Vance Fowkes, Salt Lake City, UT (US); Jesse Duane Card, American Fork, UT (US); Andrew James Menzel, Tallahassee, FL (US)

(73) Assignee: RiskRecon Inc., Purchase, NY (US)

( * ) Notice: Subject to any disclaimer, the term of this patent is extended or adjusted under 35 U.S.C. 154(b) by 0 days.

(21) Appl. No.: 18/613,219

(22) Filed: Mar. 22, 2024

(65) Prior Publication Data

US 2024/0232767 A1 Jul. 11, 2024

Related U.S. Application Data

(60) Continuation of application No. 17/669,629, filed on Feb. 11, 2022, now Pat. No. 11,948,115, which is a (Continued)

(51) Int. Cl.
*G06Q 10/0635* (2023.01)
*G06F 21/55* (2013.01)

(Continued)

(52) U.S. Cl.
CPC ....... *G06Q 10/0635* (2013.01); *G06F 21/552* (2013.01); *G06F 21/6245* (2013.01);

(Continued)

(58) Field of Classification Search
CPC . G06Q 10/0635; G06F 21/554; G06F 21/552; G06F 2221/034; H04L 63/20; H04L 63/1433
See application file for complete search history.

(56) References Cited

U.S. PATENT DOCUMENTS

2004/0015728 A1* 1/2004 Cole .................... G02B 5/3083 709/224
2012/0053981 A1* 3/2012 Lipps ................ G06Q 10/0635 705/7.28

(Continued)

OTHER PUBLICATIONS

Sougstad, Ryan Scott. "A Risk Management Approach to IT Services Contract Design." Order No. 3366928 University Of Minnesota, 2009. Ann Arbor. (Year: 2009).*

*Primary Examiner* — William S Brockington, III
(74) *Attorney, Agent, or Firm* — Hovey Williams LLP

(57) ABSTRACT

Systems and methods for automatically assessing and monitoring information security effectiveness using collected indicia of sensitive content and indicia of security measure information for a plurality of networked organizational assets/systems to provide respective asset/system value at risk ratings. Elements of the system include automated asset discovery, automated hosting provider and location discovery, collection of information harvested from public sources and, optionally non-public sources, analysis of the collected information against public, non-public, and proprietary sources, and/or mathematical models used to infer broader security program conclusions and to rank asset/system values at risk. Estimates of values at risk are used to prioritize allocation of security measures.

14 Claims, 12 Drawing Sheets

Related U.S. Application Data division of application No. 16/278,652, filed on Feb. 18, 2019, now Pat. No. 11,282,017, which is a continuation-in-part of application No. 15/207,395, filed on Jul. 11, 2016, now abandoned.

(60) Provisional application No. 62/191,362, filed on Jul. 11, 2015.

(51) Int. Cl.
*G06F 21/62* (2013.01)
*G06N 20/00* (2019.01)
*H04L 9/40* (2022.01)

(52) U.S. Cl.
CPC ......... *G06N 20/00* (2019.01); *H04L 63/1433* (2013.01); *H04L 63/205* (2013.01); *G06F 2221/034* (2013.01)

(56) References Cited

U.S. PATENT DOCUMENTS

2013/0074188 A1* 3/2013 Giakouminakis ..... G06F 21/577 726/25
2013/0247205 A1* 9/2013 Schrecker ............. G06F 21/577 726/25
2014/0046863 A1* 2/2014 Gifford ................ G06Q 50/265 705/325
2014/0278708 A1* 9/2014 Byk ................. G06Q 10/06315 705/7.25
2016/0105457 A1* 4/2016 Blake ...................... G06F 40/20 726/25
2018/0351988 A1* 12/2018 Ahuja ................. H04L 63/1416

* cited by examiner

SYSTEMS AND METHODS FOR MONITORING INFORMATION SECURITY EFFECTIVENESS

CROSS-REFERENCE TO RELATED APPLICATIONS

The present application is a continuation application of identically titled U.S. patent application Ser. No. 17/669,629, filed Feb. 11, 2022, which is a divisional application of identically titled U.S. patent application Ser. No. 16/278,652, filed Feb. 18, 2019, which is a continuation in part of U.S. patent application Ser. No. 15/207,395, filed Jul. 11, 2016, which application claims benefit under 35 U.S.C. § 119(e) from U.S. Provisional Patent Application Ser. No. 62/191,362, filed Jul. 11, 2015, each of which is incorporated herein by reference in its entirety.

FIELD

Embodiments of the invention generally relate to the field of network and information security, and in particular, to assessing and monitoring potential security risks for organizational assets/systems.

BACKGROUND

Organizations operating electronic assets on the Internet and other data networks face persistent threats from malicious software and malicious actors exploiting various vulnerabilities in network-connected hardware and software. Maintaining the proper software versions and security configurations necessary to resist these threats requires constant vigilance across numerous systems. The need for vigilance spans all networks, systems, software, applications, and data regardless of hosting location or provider. Outsourcing of network and computer services to third-party organizations magnifies the complexity of ensuring effective security. In addition to protecting the systems under their direct administration, enterprises must also ensure the security effectiveness of third-party providers. Vulnerabilities and/or lax security policies and procedures at the internal enterprise or service provider level can present significant risks to an organization. For larger companies with numerous networked systems/assets, timely and efficient deployment of security resources is critical, yet prioritization among numerous systems/assets with similar vulnerabilities is often difficult. Accordingly, improvements are sought in assessing system-wide IT security risks and in effectively deploying limited IT security resources to higher-value assets/systems most at risk.

SUMMARY

Systems and methods for assessing and monitoring network asset security risks are described with reference to organizational systems and assets, system/asset content, IT security control measures, and indicia of sensitive content and indicia of security measures. Aspects of the invention provide for inferring the content and security control features of network systems and assets to determine the likely value at risk of a system/asset. Based on these assessments, a value-at-risk ranking is established to prioritize security monitoring and other IT security resources applied across the systems and assets of the organization. As used herein, the terms "system" and "asset" may refer to any network-accessible hardware, software, data, features, functionality, and the like.

In general, "value at risk" is an assessed level of organizational value residing in sensitive data, processes or activities within systems/assets that would present an organization risk if compromised. The value at risk also reflects a respective assessed level of security measures. Accurate assessment of value at risk can assist in identifying which risk reduction controls or security measures are effective or needed. Aspects of the present invention provide for improved assessment of value at risk for IT systems/assets to better assess and allocate appropriate security control measures and resources.

One aspect of the invention features, in some embodiments, a method for automatically determining a value at risk for a network accessible computer system/asset for prioritization of security controls. The method includes connecting to the network accessible computer system/asset using a network identifier; communicating with the computer system/asset using respective network protocols; collecting data returned from the computer system/asset; and analyzing the collected data using at least one of machine learning models, regular expressions, text string matching, natural language understanding, image processing, and text analysis to identify, without accessing sensitive data itself, features/characteristics indicating at least one of mechanisms for accessing sensitive data, mechanisms for collecting sensitive data, storage of sensitive data, presentation of sensitive data, sensitive data input mechanisms, sensitive data subjects, sensitive functionality subjects, sensitive functionality, and indicia of security features of the computer system/asset. The method includes using the identified features/characteristics to establish a value at risk for the computer system/asset based in part on network proximity of the computer system/asset to one or more other network-accessible assets with a similar or higher value at risk; and using the value at risk of the computer system/asset to prioritize allocation of information technology security controls/resources to the network accessible computer system/asset relative to other computer systems/assets with different values at risk.

In some embodiments, establishing the value at risk of the computer system/asset includes assigning a weight/factor to each identified feature/characteristic and combining the weights/factors into an overall value at risk.

In some embodiments, collected data includes at least one of: network communications, HTTP headers, Network communication protocol headers, HTTP cookies, URLs, HTML, text, images, computer code, videos, files, data files, data, executable files, JavaScript, and configurations.

In some embodiments, indicators of one or more of types of sensitive data directly accessible through the computer system/asset, including at least one of: name, personal identification number (PIN), account number, birth date, physical address, email address, computer system/asset identifier, telephone number, social media identifier, user identifier, password, authentication credential, personal characteristics, identification numbers of personally owned assets, employment information, education information, medical information, transaction history, free form text, email messages, social media messages, and call recordings.

In some embodiments, collected data includes identification of indicators of one or more of types of sensitive data collected by the computer system/asset, including at least one of: name, personal identification number (PIN), account number, birth date, physical address, email address, computer system/asset identifier, telephone number, social media identifier, user identifier, password, authentication credential, personal characteristics, identification numbers of personally owned assets, employment information, education information, medical information, transaction history, free form text, email messages, social media messages, and call recordings.

In some embodiments, identification of indicators of security mechanisms associated with the computer system/asset, includes identification of at least one of: data encryption mechanism, communications encryption mechanism, authentication mechanism, user id input field, password input field, second-factor authentication input field, captcha, security question, secure cookies, fraud monitoring code, malware detection code, reference to offers of security features, claim of security certification or security testing, and use of HTTP security headers.

In some embodiments, identification of indicators of types of sensitive computer system/asset functionality provided, including at least one of: file transfer, email communications, chat communications, remote access, remote control, money transfer, file system, file storage, database, data storage, system administration, mobile access gateway, system configuration, content editing, E-commerce, querying data, accessing data, information access, media streaming (e.g., video, sound), and read-only configuration.

In some embodiments, identification of indicators of computer system/asset subject includes at least one of identification of: consumer banking, commercial banking, stock trading, financial account data, personally-identifiable data, personal health record data, internal corporate data, automobiles, prescription drugs, real estate, retail, E-commerce, natural resources, customer support, email, animals, investments, and health care.

Another aspect of the invention features, in some embodiments, a method for assessing information technology risk priorities for network computer systems/assets. The method includes receiving, by an electronic processor, a network identifier associated with a network-accessible computer system/asset of an organization; accessing, via a network, the network-accessible computer system/asset and a plurality of related network-accessible computer systems/assets; determining indicia of content features/characteristics for each of a subset of the network-accessible computer systems/assets; determining indicia of security features/characteristics of each of the subset of the network-accessible computer systems/assets; and determining network proximity between the respective network-accessible computer systems/assets. The method includes assigning a value at risk for each of the subset of the network-accessible computer systems/assets based on a combination of the determined indicia of content features/characteristics, determined indicia of security features/characteristics, and determined network proximity to other network-accessible computer systems/assets, wherein the value at risk represents a measure of relative organizational risk exposure or loss potential in the event of compromise of a respective network-accessible computer systems/assets; and automatically prioritizing allocation of security controls/measures among the subset of the network-accessible computer systems/assets based on the respective assigned values at risk.

In some embodiments, the indicia of security features/characteristics include one or more of: encryption, login field, captcha, security feature code, security-related keywords, security feature configurations, password field, security question, user authentication, secure cookies, two-factor authentication, RSA fraud protection, software bot detection, and secure connection protocols.

In some embodiments, the indicia of content features/characteristics include one or more of: presence of predetermined text, content subject matter, purpose of content accessible via the computer system/asset, purpose of content requested via the computer system/asset, functionality of the content, presence of sensitive data, collection of sensitive data, and presence of user-identifiable account data.

In some embodiments, at least one of the content, subject, and purpose of the textual content includes one or more of: publicly available information, account data, financial account data, personally-identifiable data, personal health record data, internal corporate data, privacy regulated data, sensitive organizational data, and sensitive user data.

In some embodiments, the value at risk for a network-accessible computer system/asset is assigned in part based on network relationship to other network-accessible computer systems/assets with a similar or higher value at risk.

In some embodiments, the value at risk for a network-accessible computer system/asset is assigned in part based on the functionality of the respective network-accessible computer system/asset.

In some embodiments, the value at risk for a network-accessible computer system/asset is assigned in part based on indicia of collection of sensitive data by the network-accessible computer system/asset.

In some embodiments, the value at risk represents both a measure of value and risk for any data or functionality, which if accessed by an unauthorized agent (person, computer program, or mechanical bot), if used in an unauthorized manner, or if the availability or performance characteristics of the functionality is degraded, the organization would be exposed to violation of regulations, financial liability, inability to operate related processes to desired levels, harm of reputation, legal liability, or to violation of customer agreements.

In some embodiments, assigning the value at risk includes estimating a computer system/asset purpose based on at least one of machine learning models, regular expressions, text string matching, natural language understanding, image processing, and text analysis of data available by accessing the respective network-accessible computer system/asset.

In some embodiments, the method further includes ranking a subset of the network-accessible as computer systems/assets sets as higher-value-at-risk computer systems/assets to receive at least one of increased security control measures and security control effectiveness monitoring.

Another aspect of the invention features, in some embodiments, a method for automatically estimating respective values at risk for network computer systems/assets, the method comprising: receiving, by an electronic processor, a network identifier associated with a network-accessible computer system/asset of an organization; accessing, via a network, the network-accessible computer system/asset and a plurality of related network-accessible computer systems/assets; determining indicia of content features/characteristics of each of the network-accessible computer systems/assets; determining indicia of security features/characteristics of each the network-accessible computer systems/assets; and determining network proximity between respective network-accessible computer systems/assets. The method includes inferring a value at risk for each of the network-accessible computer systems/assets based on the respective determined indicia of content features/characteristics and indicia of security features/characteristics, and based on network proximity to other network-accessible computer systems/assets with at least one of similar indicia of content features/characteristics, similar indicia of security features/characteristics, and similar values at risk.

In some embodiments, the method further includes ranking the network-accessible computer system/asset for allocation of security of measures relative to the related network-accessible computer systems/assets based on the respective values at risk.

Another aspect of the invention features, in some embodiments, a computer program product including a non-transitory computer-readable medium; and instructions stored in the computer-readable medium, that, when executed by a machine, cause the machine to perform any of the methods described herein.

Thus, the automated system offers the technical effect of an improvement in the security of networked systems. Automated assessment of the value at risk of network accessible assets/systems is a significant improvement in the technical space and greatly improves the security of the networked systems themselves by allowing administrators to focus security resources on those assets/systems with the highest value at risk.

Another aspect of the invention features, in some embodiments, a method for automatically estimating a value at risk or intrinsic organizational value of a network accessible system. The method includes connecting to the network accessible system using a network identifier; communicating with the system using respective network protocols; collecting data returned from the system; and storing collected data for analysis. The method includes analyzing the collected data using at least one of machine learning models, regular expressions, text string matching, natural language understanding, image processing, and text analysis to identify system features/characteristics useful in estimating value at risk of the system; and using identified system features/characteristics to estimate the value at risk of the system. The system includes using the estimate of the value at risk of the system to prioritize allocation of information technology security resources to the network accessible system relative to assets of a different estimated value at risk.

In some embodiments, estimating the value at risk of the system includes assigning a weight to each identified system characteristic and combining the weights into an overall value at risk rating.

Another aspect of the invention features, in some embodiments, a computer program product including a non-transitory computer-readable medium; and instructions stored in the computer-readable medium. When executed by a machine, the instructions cause the machine to: receive input of identification of a network asset of an organization; access the network asset based on the input identification; map relationships between the network asset and additional network assets of the organization; determine asset data contents for the network asset; and determine asset security control features for the network asset; assign a value at risk to the network asset based on the determined asset data contents, asset security control features, and network proximity to other value-at-risk assets, and prioritize, relative to values at risk of the additional network assets, deployment of further security control measure resources.

In some embodiments, deployment of security control measure resources includes at least one of increased security control measures and monitoring of security control effectiveness.

In some embodiments, the instructions cause the machine to rank the network asset and the additional network assets for further security assessment based on the respective values at risk.

In some embodiments, the instructions cause the machine to collect data from the network asset, including at least one of asset content, asset functionality, asset purpose, asset subject, software configurations, login requirements, and security feature protocols.

In some implementations, the method includes monitoring a plurality of organizational assets to identify a newly added organizational asset; determine a value at risk for the newly added organizational asset by the methods described herein, and prioritize the value at risk of the at least one newly-added organizational asset among a plurality of organizational assets.

DETAILED DESCRIPTION OF THE INVENTION

Figure 1:
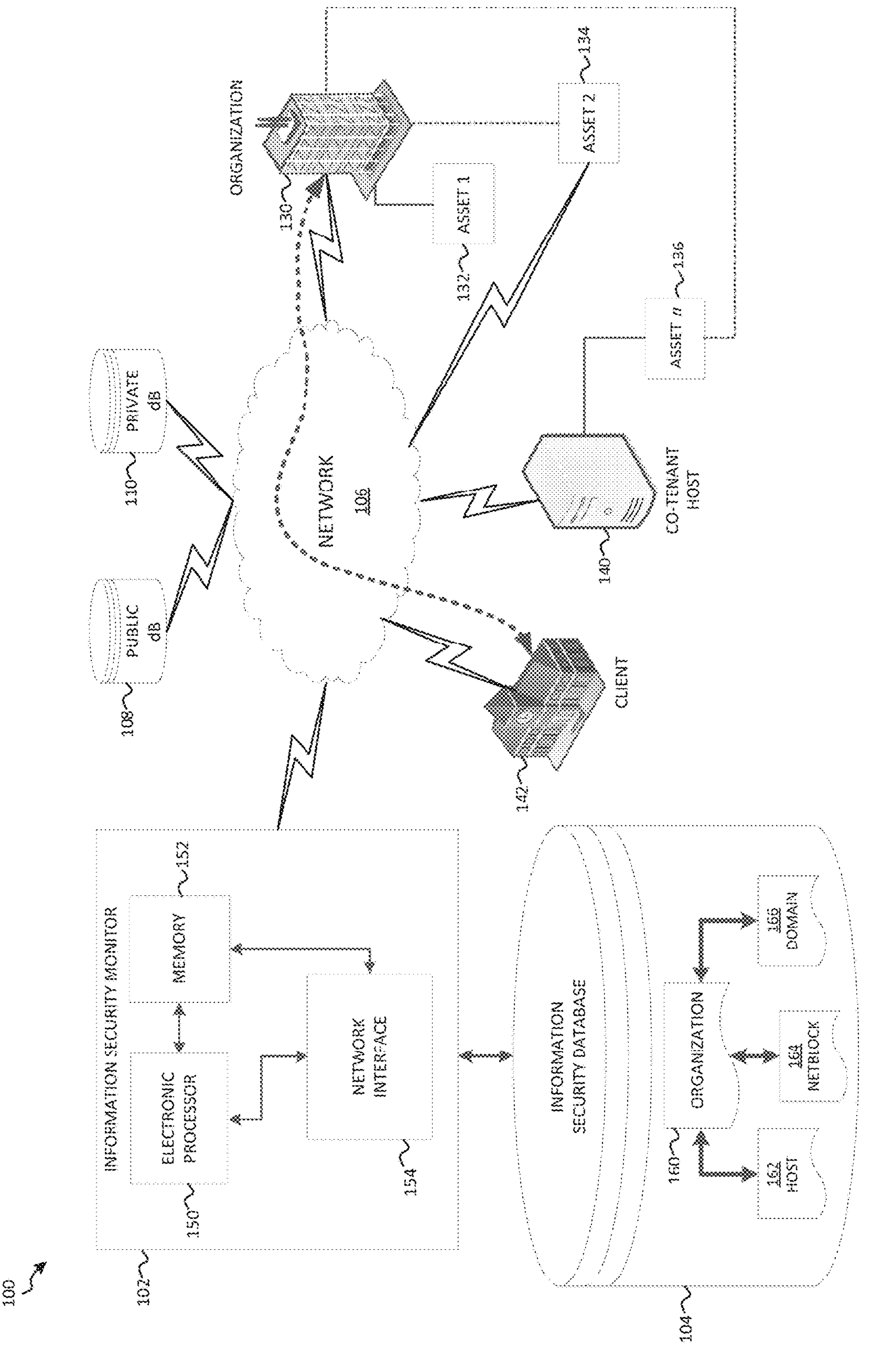
FIG. 1 is a block diagram of an information security assessment system, in accordance with some embodiments.

Reference in this specification to "one embodiment" or "an embodiment" is intended to indicate that a particular feature, structure, or characteristic described in connection with the embodiment is included in at least an embodiment of the invention. The appearances of the phrase "in one embodiment" or "an embodiment" in various places in the specification are not necessarily all referring to the same embodiment. Furthermore, the phraseology and terminology used herein is for the purpose of description and should not be regarded as limiting. For example, "including," "comprising," or "having," and variations thereof, as used herein are meant to encompass the items listed thereafter and equivalents thereof as well as additional items. The terms "mounted," "connected," and "coupled" are used broadly and encompass both direct and indirect mounting, connecting, and coupling. Further, "connected" and "coupled" are not restricted to physical or mechanical connections or couplings, and can include electrical connections or couplings, whether direct or indirect.

Before any embodiments of the invention are explained in detail, it is to be understood that the invention is not limited in its application to the details of construction and the arrangement of components set forth in the following description or illustrated in the accompanying drawings. Rather, the following description is intended to provide a convenient illustration for implementing various embodiments of the invention. As will become apparent, various changes may be made in the function and arrangement of the elements or steps described in these embodiments without departing from the scope of the invention as set forth herein. Embodiments of the description herein may be adapted to be employed with any number of different networks, databases, applications, registries, software configurations and the like and still fall within the scope of the present invention. Thus, the detailed description herein is presented for purposes of illustration only and not of limitation.

A plurality of hardware- and software-based devices, as well as a plurality of different structural components may be used to implement the invention. In addition, it should be understood that embodiments of the invention may include hardware, software, and electronic components or modules that, for purposes of discussion, may be illustrated and described as if the majority of the components were implemented solely in hardware. Embodiments of the invention may also be described herein in terms of functional and/or logical block components and various processing steps. However, one of ordinary skill in the art, and based on a reading of this detailed description, would recognize that, in at least one embodiment, such block components and electronic-based aspects of the invention may be implemented in software (for example, stored on non-transitory computer-readable medium) executable by one or more electronic processors, firmware, hardware components, or some combination thereof. Accordingly, a plurality of hardware- and software-based devices, as well as a plurality of different structural components may be utilized to implement the invention.

Embodiments of the invention may employ various integrated circuit components, e.g., memory elements, digital signal processing elements, logic elements, look-up tables, or the like, which may carry out a variety of functions under the control of one or more electronic microprocessors or other controllers or control devices. "Controllers" or "processors" described herein can include processing components, such as one or more electronic processors (e.g., microprocessors, digital signal processors (DSPs), field programmable gate arrays (FPGAs), application specific integrated circuits (ASICs), and the like), non-transitory computer-readable memory modules, input/output interfaces, and various connections (e.g., a system bus) connecting the components. For the sake of brevity, conventional techniques related to signal processing, data transmission, network control, and other such functional aspects of the systems (and the individual operating components of the systems) may not be described in detail herein. Electronic communications and notifications may be performed using any known means including direct connections, wireless connections, and the like.

Deficiencies in network security procedures at the internal enterprise or service provider level can present significant risks to an organization and its clients. Accordingly, improvements are sought in identifying, assessing, monitoring and mitigating potential risks within an internal enterprise or risks posed by third-party service providers. Accordingly, the systems and methods described herein monitor and assess the information security effectiveness of an organization for various systems/assets through automated detailed discovery and analysis of the organization's systems, network assets and related security configurations.

The security assessment system uses information collected and analyzed to provide ratings and observations of the sensitivity of data/processes and security effectiveness of various systems/assets of an organization. Key elements of the system include automated asset discovery, automated hosting provider and location discovery, automated collection of information harvested from public and non-public sources, analysis of the information against public, non-public, and proprietary sources, and/or mathematical models used to infer values at risk and broader security program conclusions.

The terms "rating" or "ranking" are used broadly to refer to positioning of something on a relative scale. The actual measure can take anything used to denote position in a relative scale such as a number, letter, symbol, and so forth. The performance measurement may be an absolute rating or a ranking relative to the rating of other systems/organizations. Ratings, rankings, risk values and other relative or absolute values or scoring may be based on a number of factors. For example, an asset may be assigned a value at risk rating based on inference of the sensitivity of content, subject, informational or structural importance to an organization. Similarly, an asset may be assigned a value at risk based, in part, on presence and effectiveness of security measures for the asset. Finally, assets may be assigned a value at risk as a function of security control measure effectiveness, e.g., as a measure of risk to an organization should security measures prove inadequate for a high-value at risk asset.

With reference to the drawings, FIG. 1 schematically illustrates one exemplary embodiment of an information security assessment system 100. The system 100 includes an information security monitor 102, an information security database 104, a network 106, a public database 108, and a private database 110.

The network 106 may be a wired or wireless network, operating according to suitable internet protocols (e.g., Transmission Control Protocol (TCP), Internet Protocol (IP), and User Datagram Protocol (UDP)). The terms "internet protocol" and "internet protocols," as used herein, may refer to Internet Protocol version 4 (IPv4), Internet Protocol version 6 (IPv6), future-developed internet protocols, or some combination of the foregoing. All or parts of the network 106 may be implemented using one or more existing networks, for example, a cellular network, the Internet, a land mobile radio (LMR) network, a short-range (for example, Bluetooth™) wireless network, a wired or wireless wide area network (WAN), a wired or wireless local area network (e.g., Wi-Fi or Ethernet), and a public switched telephone network (PSTN). The network 106 may also include future-developed networks. In some embodiments, communications with other external devices (not shown) occurs over the network 106.

As illustrated, network 106 provides connectivity to an organization 130. Organization 130 may be a business, a service provider, a government entity, or any other organization that provides or uses network-connected devices or services. The network-connected devices or services utilize network assets (1 through n) 132, 134, 136, which belong, or are associated with organization 130. Network assets (also referred to herein as "electronic assets" or "assets") may be, for example, a hostname, an IP address, a domain name, a netblock, a uniform resource location (URL), and the like. Some assets (e.g., asset 132) may be connected to network 106 through a connection shared by organization 130. Other assets (e.g., asset 134) may be connected directly to network 106. Still other assets (e.g., asset 136) may be part of a system 100 or device shared by organization 130 and others (e.g., a co-tenant host 140). The network assets may be used internally by the organization, may be accessed by members of the public via network 106, or may be used to provide hosted data or services to a client 142. Client 142 may be another organization or an individual.

In the embodiment illustrated, the information security monitor 102 includes an electronic processor 150 (for example, a microprocessor, or other electronic controller), a memory 152, and a network interface 154. Electronic processor 150, memory 152, and network interface 154, as well as other various modules (not shown) are coupled directly, by one or more control or data buses, or a combination thereof. Memory 152 may include read-only memory (ROM), random access memory (RAM), other non-transitory computer-readable media, or a combination thereof. Electronic processor 150 is configured to retrieve instructions and data from memory 152 and execute, among other things, instructions to perform the methods described herein. Electronic processor 150 communicates, via network interface 154, with at least the network assets, public database 108, private database 110, and information security database 104 using suitable network protocols.

Information security monitor 102 is communicatively coupled to information security database 104, which electronically stores information regarding the network assets in a relational database (e.g., a MySQL database). Information security database 104 includes records for storing information regarding organizations and assets (e.g., an organization record 160, a host record 162, a netblock record 164, and a domain record 166). Information security monitor 102 reads and writes such information to and from information security database 104, which database may be housed on a suitable database server (not shown); integrated with, or internal to, information security monitor 102; or external to information security monitor 102 and accessible over network 106.

Public database 108 is a database, which is available publicly over network 106, which database may contain information regarding the network assets. Examples of a public database include a domain name server, a WHOIS server, an IP address numbering authority server, a route server, a public domain software repository, and the like. Private database 110 is a database, which is available over network 106 only to registered users. Private database 110 may contain similar data as public database 108, and it may also contain proprietary data regarding assets (e.g., aggregated data, internal enterprise data, or other paid-for data useful in evaluating the information security of the assets).

Regardless of how or by whom the network assets 132, 134, 136 are used the users of the assets wish to keep those assets secure to protect both the network assets and other assets (e.g., other networks, system 100*s*, data stores, etc.) connected to them. Accordingly, embodiments of the present invention provide methods for monitoring the information security of the network assets.

FIGS. 2A through 2E are flow charts illustrating an exemplary method 200 for monitoring the information security of the assets of an organization. Method 200 begins at stage 202, when the SYSTEM 100 receives as input one or more references to an electronic ASSET belonging to the organization being evaluated (e.g., organization 130). SYSTEM 100 then determines if the input ASSET belongs to or is related to ORGANIZATION 130. If ASSET is determined to belong to, or is determined to be related to, ORGANIZATION 103, SYSTEM 100 then proceeds to stage 204. SYSTEM 100 may also take in other information such as ORGANIZATION name, email addresses, ticker symbol, industry sector, and the like.

At 204, if SYSTEM 100 has assessed the ORGANIZATION previously, then SYSTEM 100 can use the inputs and decisions of the USER from a specified previous assessment as a baseline for the current assessment. Where a previous assessment configuration is used, then in all cases where there is a description for USER to do something, SYSTEM 100 may automatically respond based on the answers/input from the previous assessment if the same question is being asked of the user. In cases where SYSTEM 100 discovers something not previously observed then SYSTEM 100 may prompt the USER for a decision if a decision is required.

For every unprocessed ASSET (e.g., IP addresses, hosts, and domains), SYSTEM 100 performs one or more of the following to process the asset. Determines if ASSET has HTTP listener(s). Determines if ASSET is a network-listening host (HOST) by methods including looking up ASSET in search engines, public host listing databases, paid-for host listing databases, sending a network communication to the ASSET and observing the response, and the like. If asset is a HOST, SYSTEM 100 creates a HOST RECORD and adds HOST to host list (HOST LIST). A HOST is a network addressable computer. A HOST LIST is a listing of HOSTS. A HOST RECORD is a set of data containing attributes of the HOST that may include—hostname (HOSTNAME), domain name (DOMAIN), IP address (IP), geolocation of the host, network services running, etc. Looks up the domain registration record for the HOST and creates DOMAIN RECORD and adds DOMAIN RECORD to DOMAIN LIST. A DOMAIN RECORD is a data record of domain attributes that is a representation of the public domain registration record for the domain. Domain registration records include items such as domain name, registrar, registrar contact info, admin, admin contact info, owner, owner contact info, domain status flags, domain registration date, domain registration expiration date, and so forth. SYSTEM 100 looks up the IP addresses (IP) of the ASSET and for each IP it looks up the IP ownership and related netblock information (NETBLOCK RECORD). IP information is added to the HOST LIST. NETBLOCK RECORD is added to NETBLOCK LIST. A NETBLOCK RECORD is a data record of the netblock attributes that is a representation of the public netblock registration record for the netblock. Netblock registration records include items such as IP address range, netblock name, netblock owner, netblock owner contact information, netblock registrar, and the like.

For each DOMAIN RECORD, SYSTEM 100 extracts domain names and host names and IP addresses from the DOMAIN RECORD. Domain names and hostnames are handled as new ASSETS. Similarly, for each NETBLOCK RECORD, SYSTEM 100 extracts domain names and host names and IP addresses from the NETBLOCK registration record. Domain names, hostnames, and IP addresses are handled as new ASSETS. For each new ASSET discovered, SYSTEM 100 processes the asset, as described above.

At stage 208*a*, for each DOMAIN for which ownership is not known, SYSTEM 100 automatically predicts if the DOMAIN is owned by the ORGANIZATION based on comparison of domain record attributes against the domain record attributes of every domain previously authorized for assessment. SYSTEM 100's automated prediction returns a numeric score. The higher the score, the higher the likelihood the DOMAIN is owned by the ORGANIZATION. Scoring is based on mathematical and heuristic analysis of domain record attributes of DOMAIN against attributes of all other DOMAIN records previously flagged as related to the ORGANIZATION. More specifically, SYSTEM 100 predicts domain ownership score by comparing the attributes of the DOMAIN RECORD in question with the attributes of DOMAIN RECORDS for which ownership was already decided. Attributes of DOMAIN RECORDS flagged as related to the ORGANIZATION that have values that match the same attributes of the DOMAIN RECORD in question result in an ownership guess score increase. Attributes of DOMAIN RECORDS flagged as not related to the ORGANIZATION that have values that match the same attributes of the DOMAIN RECORD in question result in an ownership guess score decrease. SYSTEM 100 assigns a weight to each attribute according to its strength in predicting ownership. SYSTEM 100 also factors in DOMAIN ownership decisions from prior assessments of ORGANIZATION and other ORGANIZATIONS. For example, a DOMAIN RECORD associated with numerous previous assessments for which DOMAIN ownership was always flagged as not related will decrease the ownership guess score for the same DOMAIN in a subsequent assessment.

Each time a DOMAIN ownership determination scoring process is executed, SYSTEM 100 executes a related HOST ownership determination scoring process to automatically determine if any of the HOST ownership guess scores should be changed based on comparison of attributes of the hostname and the domain registration record attributes. Primarily HOST ownership guess scores are based on the ownership guess score of the related DOMAIN.

For each DOMAIN, if the ownership guess score does not provide a high enough certainty of domain ownership (is the DOMAIN owned or related to ORGANIZATION), SYSTEM 100 will show the USER the DOMAIN registration record, the DOMAIN OWNERSHIP DETERMINATION SCORE, and prompt the USER to determine if the DOMAIN should be included in the assessment.

At stage 208*b*, for each NETBLOCK RECORD for which ownership is not known, SYSTEM 100 automatically predicts if the NETBLOCK is owned by the ORGANIZATION based on comparison of domain record attributes against the domain record attributes of every domain previously authorized for assessment. SYSTEM 100's automated prediction returns a numeric score. The higher the score, the higher the likelihood the NETBLOCK is owned by the ORGANIZATION. Scoring is based on mathematical and heuristic analysis of domain record attributes of NETBLOCK against attributes of all other NETBLOCK records previously flagged as related to the ORGANIZATION. More specifically, SYSTEM 100 predicts netblock ownership score by comparing the attributes of the NETBLOCK RECORD in question with the attributes of NETBLOCK RECORDS for which ownership was already decided. Attributes of NETBLOCK RECORDS flagged as related to the ORGANIZATION that have values that match the same attributes of the NETBLOCK RECORD in question result in an ownership guess score increase. Attributes of NETBLOCK RECORDS flagged as not related to the ORGANIZATION that have values that match the same attributes of the NETBLOCK RECORD in question result in an ownership guess score decrease. SYSTEM 100 assigns a weight to each attribute according to its strength in predicting ownership. SYSTEM 100 also factors in NETBLOCK ownership decisions from prior assessments of ORGANIZATION and other ORGANIZATIONS. For example, a NETBLOCK RECORD associated with numerous previous assessments for which NETBLOCK ownership was always flagged as not related will decrease the ownership guess score for the same NETBLOCK in a subsequent assessment.

For each NETBLOCK, if the netblock ownership guess score does not provide a high enough certainty of NETBLOCK ownership (is the NETBLOCK owned or related to ORGANIZATION), SYSTEM 100 will show the USER the NETBLOCK record, the NETBLOCK OWNERSHIP DETERMINATION SCORE, and prompt the USER to determine if the NETBLOCK should be included in the assessment.

For each NETBLOCK the USER is shown the netblock registration record, the netblock ownership guess score, and the USER is asked if the NETBLOCK should be searched (NETBLOCK HOST DISCOVERY) for other hosts.

Figure 2A:
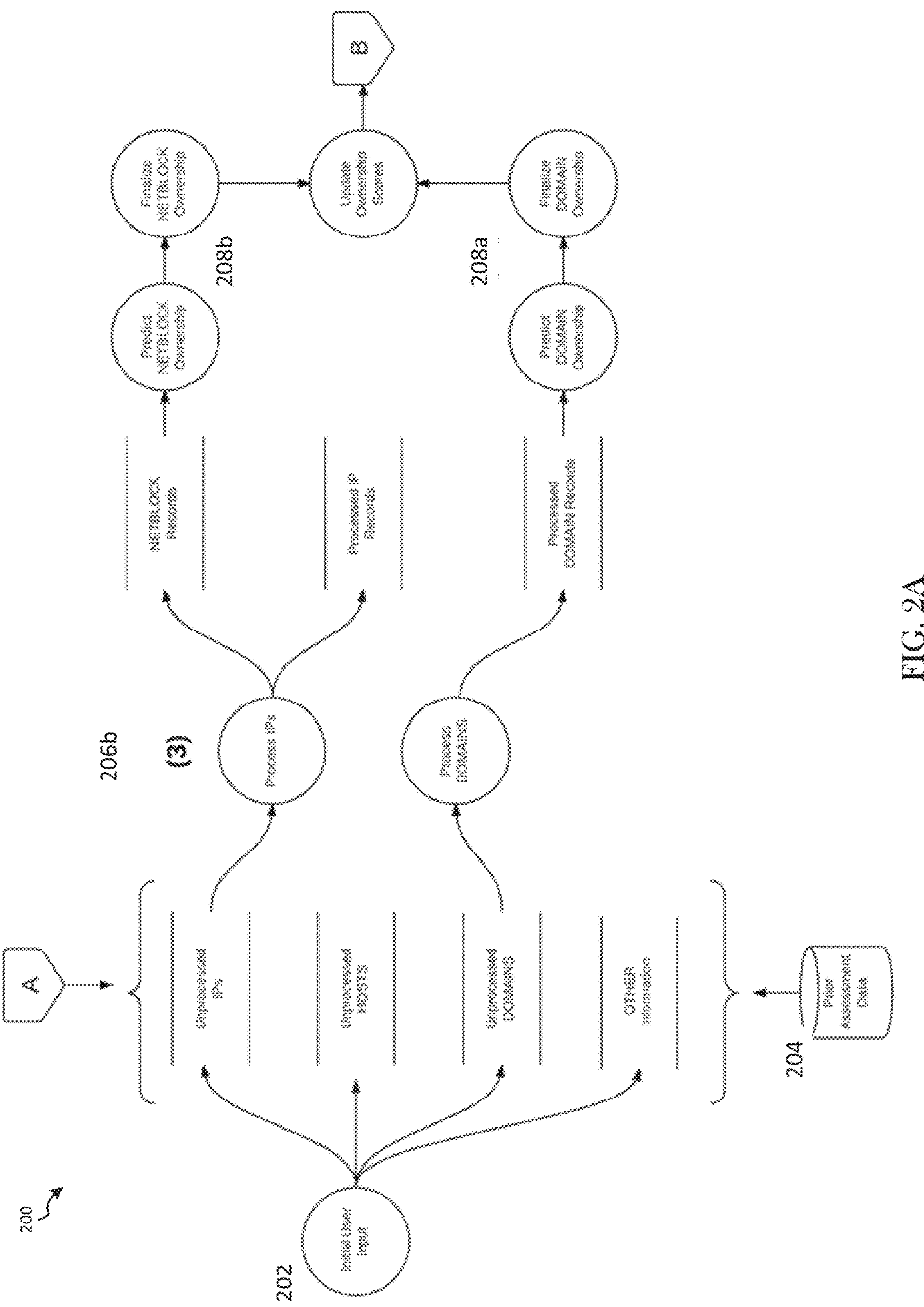
FIGS. 2A, 2B, 2C, 2D, and 2E are flow charts illustrating a method for assessing the information security of the assets of an organization, according to some embodiments.
Figure 2B:
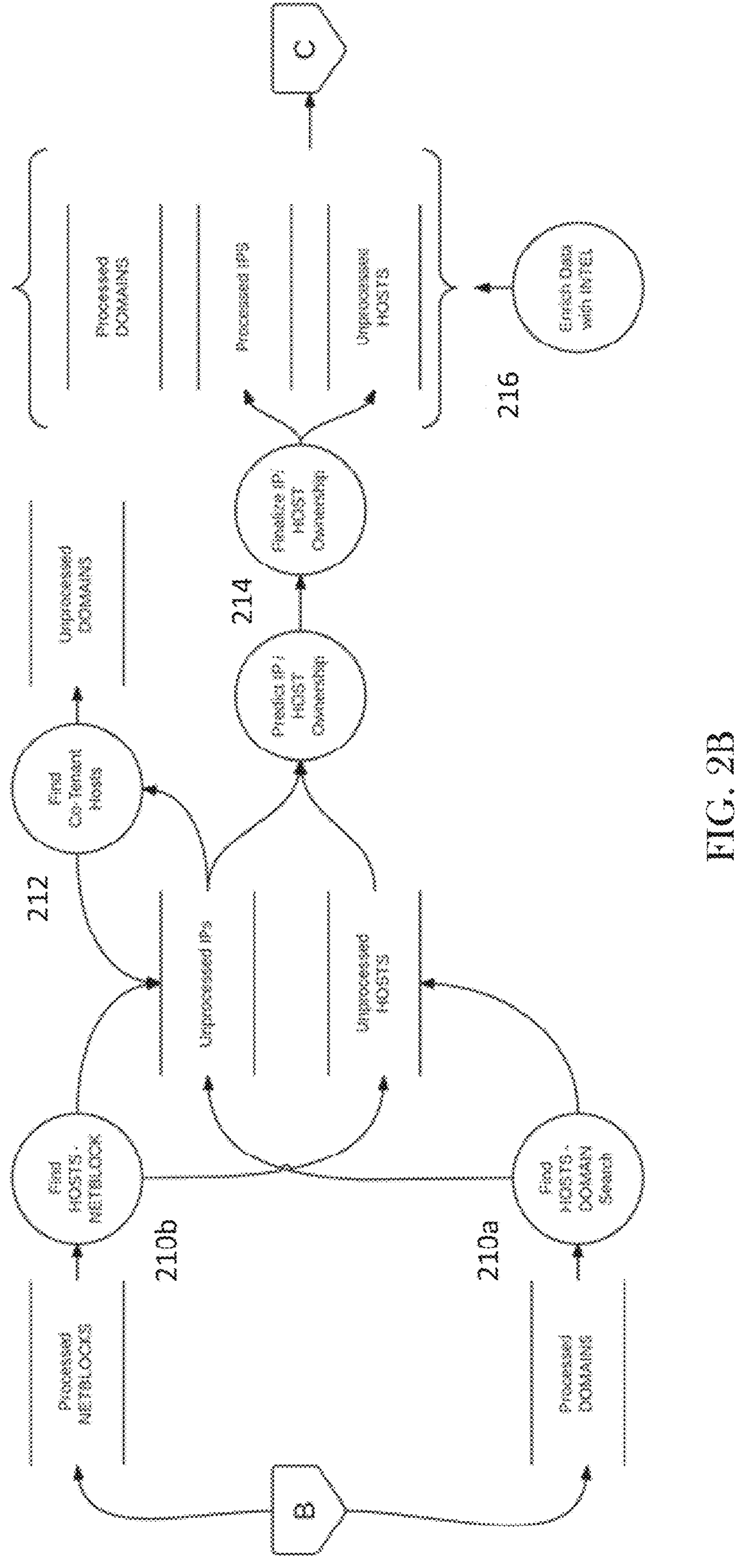

Turning now to FIG. 2B, the method 200 continues, at stage 210*a*, where for each DOMAIN flagged as owned by ORGANIZATION, SYSTEM 100 conducts various searches to find other ASSETS that are part of the DOMAIN. Search sources include search engine searches, proprietary, paid-for, and public databases (e.g., of public database 108, private database 110, or a combination of both) in which ASSETS that are part of the domain can be found. Results are automatically parsed. For each HOST discovered, SYSTEM 100 processes the asset, as described above.

At stage 210*b*, for each IP in each NETBLOCK owned by the ORGANIZATION, SYSTEM 100 performs the following: Looks up the HOSTNAME of the IP. Determines if IP has HTTP listener(s). Determines if IP is a network-listening host (HOST) by methods including looking up ASSET in search engines, public host listing databases, paid-for host listing databases, sending a network communication to the ASSET and observing the response, and so forth. If IP is a HOST, creates a HOST RECORD and adds HOST to host list (HOST LIST). A HOST is a network addressable computer. A HOST LIST includes a listing of HOSTS. A HOST RECORD includes a set of data containing attributes of the HOST that may include—hostname (HOSTNAME), domain name (DOMAIN), IP address (IP), geolocation of the host, network services running, etc. Looks up the domain registration record for the HOST and creates DOMAIN RECORD and adds DOMAIN RECORD to DOMAIN LIST. A DOMAIN RECORD includes a data record of domain attributes that is a representation of the public domain registration record for the domain. Domain registration records include items such as domain name, registrar, registrar contact info, admin, admin contact info, owner, owner contact info, domain status flags, domain registration date, domain registration expiration date, and the like. SYSTEM 100 assigns the HOST an ownership guess score based on ownership guess score for related DOMAIN RECORD.

At stage 212, for each ORGANIZATION HOST found through the previous methods, each HOST is checked to see if it is a CO-TENANT HOST. A CO-TENANT HOST is a host using an IP that is used by more than one SYSTEM. If it is a CO-TENANT HOST, then the HOST RECORD is updated with the number of CO-TENANT HOSTS and each CO-TENANT HOST is added to the HOST LIST as potential ORGANIZATION HOSTS. CO-TENANT HOSTS are discovered through automated and manual IP search engine searches, searches of IP HOST relationship databases, and search of other public and paid-for databases that list IP HOST relationships. For each new HOST discovered, SYSTEM 100 creates a HOST RECORD and adds HOST to host list (HOST LIST). A HOST is a network addressable computer. A HOST LIST is a listing of HOSTS. A HOST RECORD is a set of data containing attributes of the HOST that may include—hostname (HOSTNAME), domain name (DOMAIN), IP address (IP), geolocation of the host, network services running, etc. SYSTEM 100 looks up the domain registration record for the HOST and creates DOMAIN RECORD and adds DOMAIN RECORD to DOMAIN LIST. A DOMAIN RECORD is a data record of domain attributes that is a representation of the public domain registration record for the DOMAIN. Domain registration records include items such as domain name, registrar, registrar contact info, admin, admin contact info, owner, owner contact info, domain status flags, domain registration date, domain registration expiration date, and the like. SYSTEM 100 assigns the HOST an ownership guess score based on ownership guess score for related DOMAIN RECORD.

At stage 214, for each HOST, if the HOST ownership guess score does not provide a high enough certainty of HOST ownership (is the HOST owned or related to ORGANIZATION 103 such that it should be included in the scope of the assessment); SYSTEM 100 will show the USER information useful to determining if the HOST should be included in the assessment. This information presented may include the HOST RECORD, the related DOMAIN RECORD (or portions thereof), the HOST ownership guess score, and a representation of one or more web pages resident on the HOST. In association with presenting this information to the USER, SYSTEM 100 prompts the USER to determine if the HOST should be included in the assessment.

The USERS response (YES or NO) may result in changes to the HOST ownership guess scores for related domains and hosts. A YES may increase guess scores for domains and hosts SYSTEM 100 determines to be related. A NO may decrease guess scores for domains and hosts SYSTEM 100 determines to be related.

At stage 216, for each ASSET determined to be in-scope (owned or materially related to the organization), additional analytics including third-party data services, are engaged to enrich information about ASSETS. This may include threat intelligence, network service information, domain reputation scores, domain history, IP history, IP hosting history, and the like.

Figure 2C:
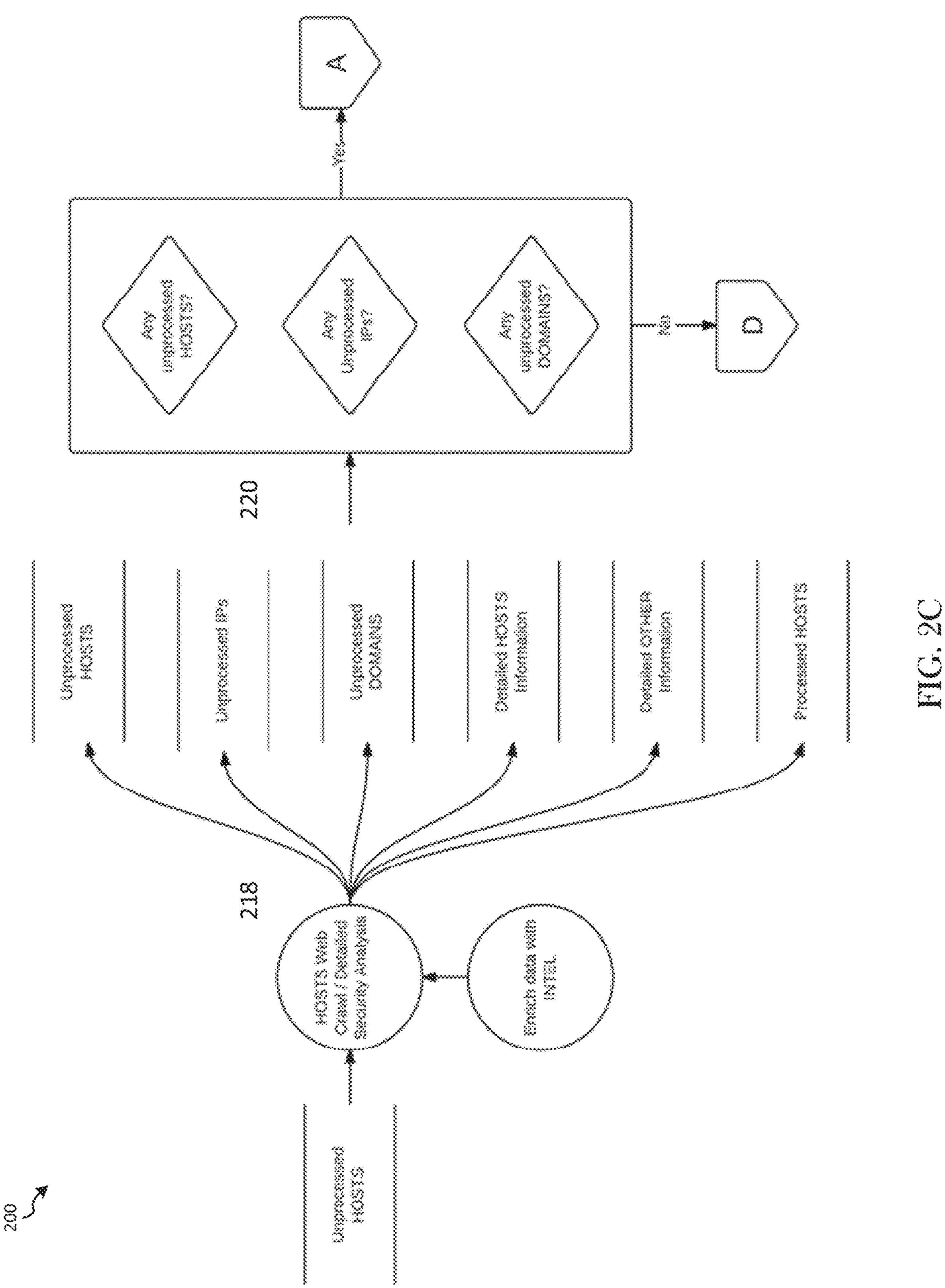

Turning now to FIG. 2C, at stage 218, each HOST in HOST LIST that has been flagged for assessment and has not been assessed as described in this section, SYSTEM 100 automatically executes a web crawl of the HOST. For each web page crawled, SYSTEM 100 automatically mines information that could be relevant for security analysis. This includes indicators of software and software versions running on the HOST, email addresses, references to downloadable files, error handling functionality, client-side code, third-party libraries, linked resources, servers, operating systems, content management systems, software security configurations, cookies, HTTP headers, encryption certificates and configurations, content delivered to the client, and so forth. SYSTEM 100 automatically categorizes pages into categories such as content, login pages, password reset pages, admin pages, default install pages and so forth. SYSTEM 100 detects and responds to response codes to extract relevant security information, process redirects, and the like.

For each web page, SYSTEM 100 records each ASSET reference (HOST NAME, IP, DOMAIN, etc.) discovered in the web crawl of the HOST web pages. These are new ASSETS that may be included in scope of the assessment.

SYSTEM 100 triggers subsequent requests to gather further information where configured to do so based on detections of certain states. For example, if DRUPAL is found to be running then SYSTEM 100 automatically initiates additional DRUPAL-specific checks/inquiries to gain further information regarding the security. The information collected is used to determine the security state of each component found based on publicly available information.

Further, each URL or web link on each page is recorded. URLs or web links to new systems that have not been assessed before are flagged as potential other HOSTS to scan in the next round of scanning.

At stage 220, for each new HOST and each new DOMAIN and each new IP address discovered at 218, the process repeats, beginning at FIG. 2A, reference A. This continues until at 220 no HOSTS are discovered for which no HOST ownership decision has not yet been made. All hosts found through all processes are recorded. All hosts flagged to be not included in scope are considered THIRD-PARTY RELATED HOSTS. THIRD-PARTY RELATED HOSTS are recorded as THIRD-PARTY HOSTS.

Figure 2D:
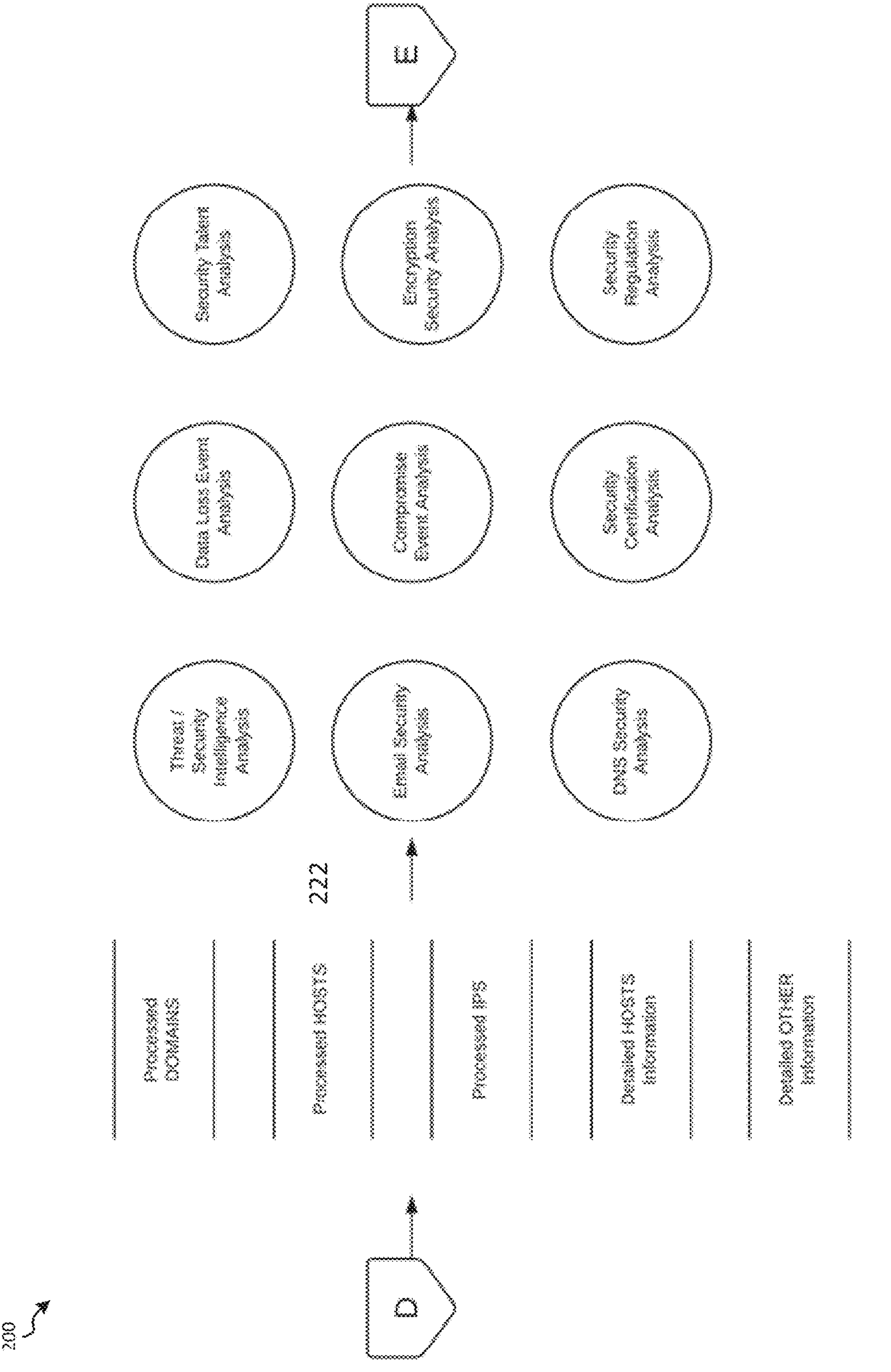

Turning now to FIG. 2D, at stage 222, using the information gathered through previous phases, SYSTEM 100 exercises algorithms and analytics, including data from proprietary and public sources. Examples of categories of analysis may include the following:

Enumeration and Security Configuration Analysis of Email Servers

For each domain in scope, the email server is automatically discovered and security assessed across multiple dimensions.

Encryption Analysis

For each server found running encryption, the encryption configuration—certificates and related protocols and network services are analyzed for security effectiveness—algorithms, key lengths, subject, etc.

Threat Intelligence Analysis

For each ASSET found—both HOSTS found to be owned by the company and hosts that the company links to (THIRD-PARTY HOSTS)—the host IP addresses, domain names, and host names are analyzed against security intelligence records sourced from a wide array of public and private sources. These threat intelligence lists enumerate ASSETS that are identified by one or more threat intelligence source to be acting badly in some way. This may include active scanning, malware, compromises, spamming, and so forth.

Data loss/Compromise News Alert Discovery

Leveraging all information gathered through the assessment and also GENERAL ORGANIZATION INFORMATION, SYSTEM 100 searches public and private repositories for indicators of data loss events, compromise events, and other relevant information.

Security Certification Discovery

Leveraging all information gathered through the assessment and also GENERAL ORGANIZATION INFORMATION, SYSTEM 100 searches public and private repositories to find security certifications.

Security Regulation Discovery

Leveraging all information gathered through the assessment and also GENERAL ORGANIZATION INFORMATION, SYSTEM 100 searches public and private repositories to find security regulations to which the organization is subject.

DNS Analysis

For each domain found, SYSTEM 100 security analyzes DNS configuration using the system security analysis settings.

Figure 2E:
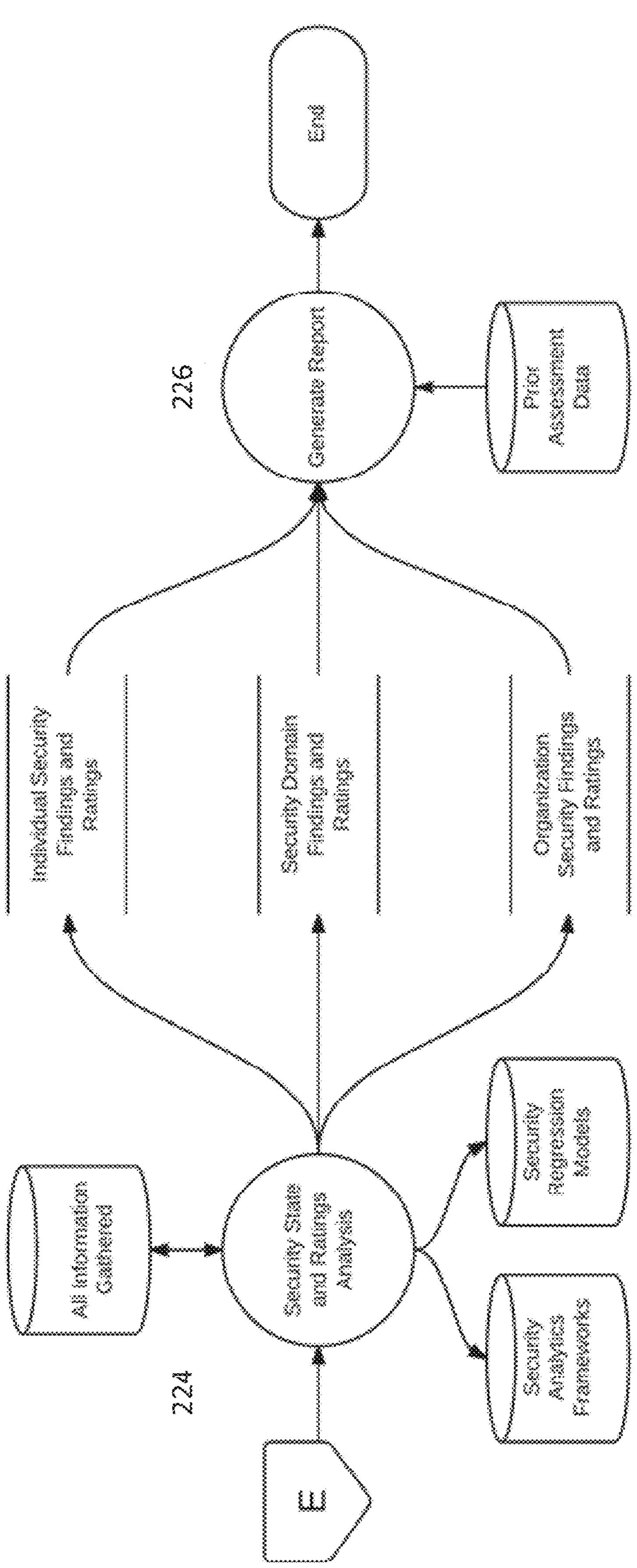

Turning now to FIG. 2E, at stage 224, the information discovered and evaluated is run through an analysis phase that leverages SYSTEM models, frameworks, structures, and algorithms to measure and report the effectiveness of the ORGANIZATION security program through multiple levels. These levels include:

Individual findings—Individual findings are generated by analyzing the information gathered during the prior phases against public and private repositories of security information. The pass/fail status of the finding is based on look up of data points identified through information gathering phase against knowledge repositories, both public and private. The severity is based on mathematical, heuristic, or knowledge-based analysis/lookup.

Security Domain Ratings/Findings—These are the individual findings summarized and grouped into security domains (DOMAINS). Each DOMAIN represents a sub category or program of an overall security program (SECURITY PROGRAM). For example, DOMAINS can include areas such as, but not limited to: governance, web application security, security patching, threat intelligence and response, encryption, and the like. The rating for a DOMAIN is based on individual component parts of the domain and its related findings combined with the associated weighting and mathematical or heuristic analysis of the scoring for the given DOMAIN.

Organization Level Rating/Findings—The overall security effectiveness of the organization is based on the combined results of individual findings and individual security domain ratings/findings. Mathematics/heuristics are used to weight the individual domain ratings and combine them into an overall value/rating.

SYSTEM 100 uses mathematic/heuristic models to infer the effectiveness/maturity of individual security domains and to infer the effectiveness/security of the overall security program. For example, SYSTEM 100 can infer based on limited information gathered through prior phases the probability that application security programs are in a particular state. Among other things, SYSTEM 100 uses regression analysis and other statistical models to accurately infer the security state of an ORGANIZATION or of a DOMAIN from the information gathered by SYSTEM 100. The model is built leveraging the SYSTEM data and data from full-disclosure professional assessments.

At stage 226, SYSTEM 100 compiles information into a report that is automatically generated and includes some or all of the following: Description of methods; Description of rating scale; Overview of organization; Overview of IT assets discovered; Value-at-risk rating for assets/systems, Overall security rating; Security rating for each security domain; Rating history/trend analysis based on comparison with prior assessments; Security profile—a more detailed view of the ratings for each subcomponent of each security domain; Detailed rating and information for each security domain; Detailed assessment results for each ASSET or HOST included in the report; and Appendix containing some or all of data collected (e.g., domain names and related information, hosts and related information; host relationship (i.e., what hosts do each host link to); email addresses; and the like).

Figure 3:
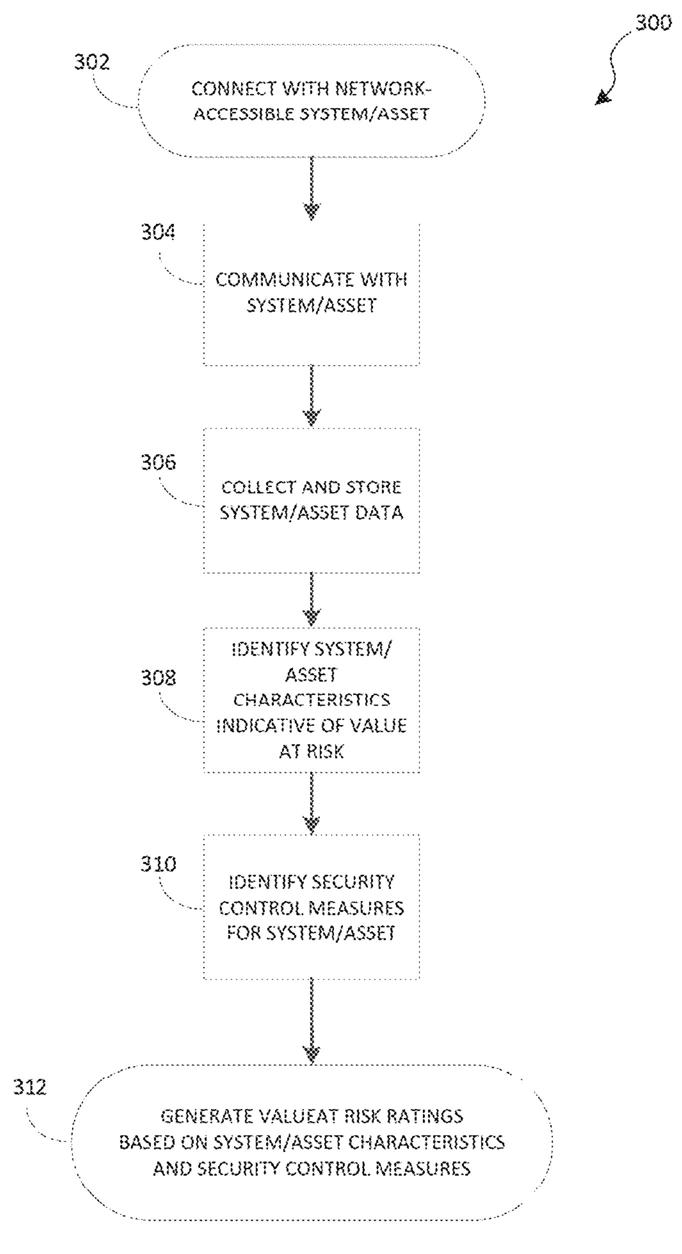
FIG. 3 is a flow chart of a method for estimating the value at risk of a network-accessible system/asset, according to some embodiments.

FIG. 3 is a flow chart of an exemplary method 300 for estimating the value at risk of a network-accessible system/asset. At stage 302, an automated IT security assessment engine connects with a network-accessible system/asset. At stage 304, the engine communicates with the system/asset to retrieve various data about or from the system/asset. At stage 306, the engine collects and stores data returned from the system/asset. At stage 308, the engine analyzes the collected data using at least one of machine learning models, regular expressions, text string matching, natural language understanding, image processing, and text analysis to identify system features/characteristics useful in estimating a value at risk of the system. At stage 310, the engine identifies likely security control measures associated with the system/asset. In some cases, the security control measures are indicative of the value at risk of the system/asset. Accordingly, at stage 312, the engine generates estimates or rankings of the value at risk of a network-accessible system/asset of an organization. These estimates and rankings take into account the indicia security control measures identified for the system/asset, e.g., as a factor in estimating the value at risk.

In some embodiments, estimating the value at risk of the system includes assigning a weight to each identified system characteristic and combining the weights into an overall value at risk rating.

The security assessment engine may include dedicated software modules to access, collect, and analyze various system/asset data. For example, one module may determine the system data input mechanisms or types of system functionality provided. Another module may determine types of data directly accessible through the system. Another module may determine types of data collected by the system. Another module may determine system subject matter types. Another module may determine types of security mechanisms implemented in the system. Another module may determine indicia of sensitive data input, storage, processing and the like. Another module may determine indicia of security mechanisms implemented in the system.

Data collected by the security assessment engine may include any number of: network communications, HTTP headers, cookies, URLs, HTML, text, images, computer code, videos, files, data files, data, executable files, JavaScript, and configurations. Accessible data or data collected by the system can include: name (e.g., full name, first name, or last name), personal identification number (PIN) (e.g., social security number, passport number, driver's license number, taxpayer identification number, patient identification number), account number (e.g., financial account number, credit card number, membership number), birth date, physical address, email address, computer asset identifier (e.g., IP address, media access control address, system name), telephone number, social media identifier, user identifier, password, authentication credential, personal characteristics (e.g., photographic images, height, weight, race, photo, biometric data), identification numbers of personally owned assets, (e.g., vehicle registration number, title number, license plate number, vehicle identification number), employment information, education information, medical information, transaction history, free form text, email messages, social media messages, and call recordings.

Identification/indicia of security mechanisms implemented in the system may include: data encryption mechanisms, communications encryption mechanisms, authentication mechanisms, user id input field, password input field, second-factor authentication input field, captcha, security question, secure cookies, fraud monitoring code, malware detection code, reference to offers of security features, claim of security certification or security testing, and use of HTTP security headers.

Identification/indicia of types of system functionality provided may include: file transfer capability, email communications, chat communications, remote access, remote control, money transfer, file system, file storage, database, system administration, mobile access gateway, system configuration, content editing, E-commerce, media streaming (e.g., video, sound), and read only configuration.

Identification/indicia of system subject may include, e.g., consumer banking, commercial banking, stock trading, automobiles, prescription drugs, real estate, retail, E-commerce, natural resources, customer support, email, animals, investments, and health care.

Figure 4:
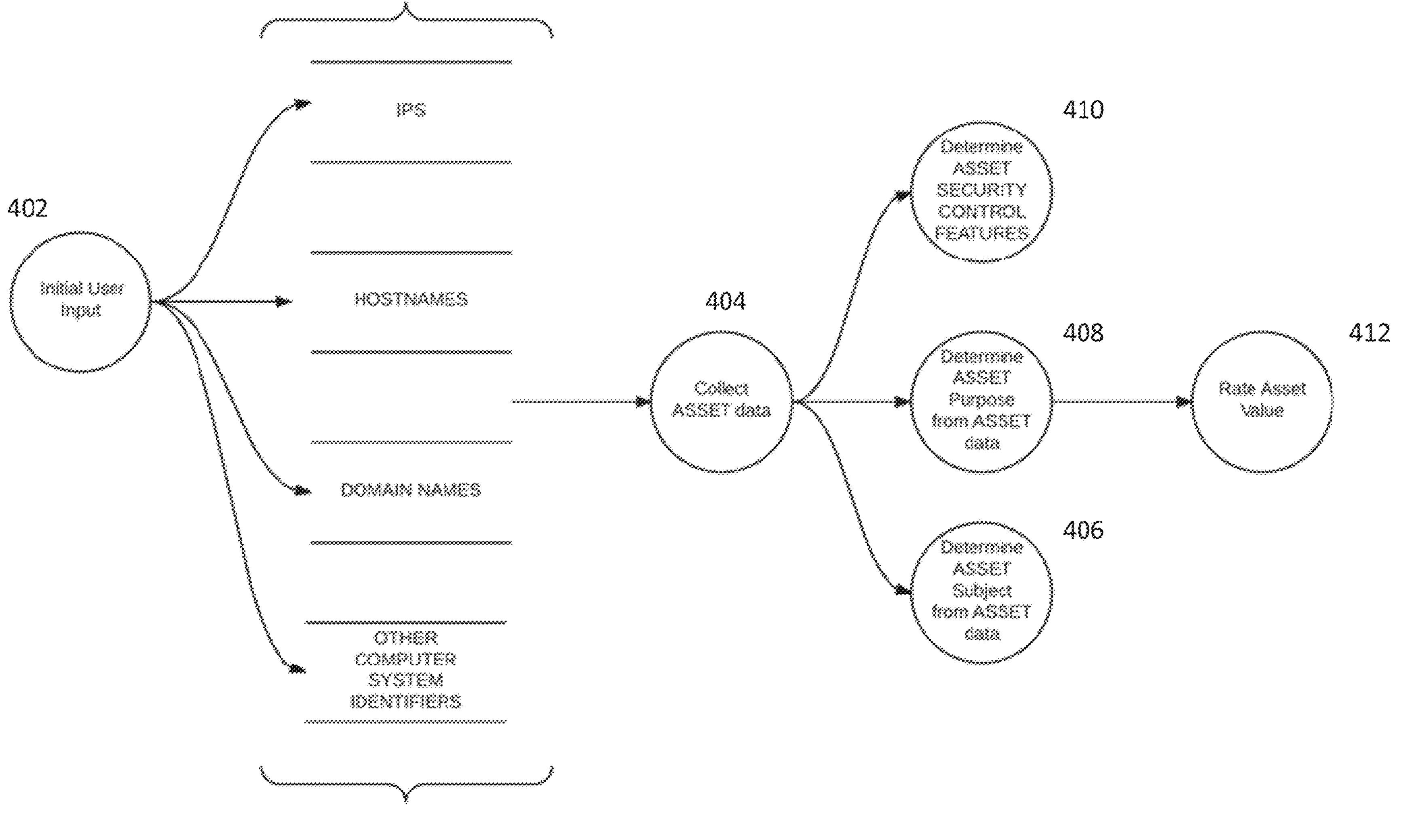
FIG. 4 is a flow chart of a method for generating an asset value at risk rating, according to some embodiments.

FIG. 4 is a flow chart of an exemplary method 400 for generating an asset value at risk rating for a network-accessible system or other electronic asset (ASSET). Organizations deploy computer-based systems across "related assets" on which they operate their processes, manage their data, and perform communications, among other functions. Many organizations allocate security control resources to ASSETS based on the sensitivity or other value of each ASSET in order to minimize realization of bad outcomes. These bad outcomes that organizations seek to avoid include:

Asset Disruption—the impact to the organization in the event the ASSET becomes operationally unavailable;

Asset Data Breach—the impact to the organization of the data contained within the ASSET being accessed by an unauthorized entity; and Asset Account Takeover—the impact to the organization of execution of fraudulent transactions due to unauthorized access to ASSET functions.

Asset owners may measure ASSET value at risk based on attributes such as data types and data volume managed or hosted by the ASSET, transaction capabilities of the ASSETS, and criticality of the ASSET in supporting larger business processes. With method 400, SYSTEM 100 automatically determines the value of an ASSET based on the content contained in the ASSET and the security controls observed implemented in the ASSET. In some implementations, only publicly available information is used. In other words, in some implementations, an assets relation to sensitive data may be identified without accessing the sensitive data itself. In some implementations, privileged access to the ASSET contents through access to non-public content is used and/or privileged access to the network on which the ASSET resides is used.

SYSTEM 100 uses information collected and analyzed data to provide a measure of the value of the ASSET according to the context in which the ASSET operates. Value measurement may be an absolute rating or a ranking relative to other ASSETS. Key elements of SYSTEM 100 comprise automated asset content collection, analysis of asset data using methods and algorithms to determine the subject and/or purpose of the ASSET and discovery and analysis of security features implemented in the ASSET. ASSET data is identified, collected and classified using at least one of machine learning models, regular expressions, text string matching, natural language understanding, image processing, and text analysis. Identified system features/characteristics are then used to estimate the value at risk level of the ASSET. Asset data and security features may be gathered and observed from public portions of the ASSET in which no specific asset access permissions are required or from no-public portions of the ASSET that require specific permissions to access information using asset access permissions. Asset access permissions may involve physical or logical access as it relates to the ASSET and/or the network on which the asset resides. Analysis of asset data to determine asset subject, purpose, and security features may involve use of external resources such as lists of signatures used to identify security features, libraries of analysis tables to aid in determining system subject and purpose, and other algorithms and data.

The output of the automated asset analysis is a measure of the value at risk of the ASSET, which may be absolute or relative in nature, and may also include a description and/or categorization of the ASSET content, subject and/or purpose. These asset features/characteristics may be used to estimate a value at risk ranking relative to other assets of an organization.

At block 402, SYSTEM 100 takes as input one or more references to an ASSET belonging to the organization being evaluated (ORGANIZATION). ASSET can include hostname, IP address, domain name, netblock, URL, or other computer/software identifiers. If non-public asset information will be collected, the use may supply any credentials necessary to access non-public information. If supplied, credentials are then used by SYSTEM 100 in accessing information from respective ASSETS.

At block 404, SYSTEM 100 accesses each ASSET and gathers data from the ASSET by interacting with the ASSET according to the protocols of the ASSET used to communicate with the ASSET and access information contained in the ASSET. SYSTEM 100 analyzes ASSET data after information is collected from the ASSET. The ASSET information may be analyzed by SYSTEM 100 as it is collected, or the ASSET information may be stored for analysis at a future time.

Data collected may include any number of: network communications, HTTP headers, cookies, URLs, HTML, text, images, computer code, videos, files, data files, data files, database contents, executable files, JavaScript, configurations, and the like. Accessible data or data collected by the system can include: name (e.g., full name, first name, or last name), personal identification number (PIN) (e.g., social security number, passport number, driver's license number, taxpayer identification number, patient identification number), account number (e.g., financial account number, credit card number, membership number), birth date, physical address, email address, computer asset identifier (e.g., IP address, media access control address, system name), telephone number, social media identifier, user identifier, password, authentication credential, personal characteristics (e.g., photographic images, height, weight, race, photo, biometric data), identification numbers of personally owned assets, (e.g., vehicle registration number, title number, license plate number, vehicle identification number), employment information, education information, medical information, transaction history, free form text, email messages, social media messages, and call recordings.

At block 406, for each ASSET, SYSTEM 100 analyzes the ASSET data to determine ASSET content subject. ASSET SUBJECT is a broad reference to the SUBJECT of the asset information/content based on content analysis. For example, an ASSET that contains content related to automobiles would have a SUBJECT of automobiles. An ASSET that contains content related to bicycling would have a SUBJECT of bicycling. An ASSET that contains content related to consumer banking would have a SUBJECT of consumer banking.

The SUBJECT is determined through one or more algorithms, such as signature-based analysis of the content, language processing algorithms, or other learning algorithms.

The signature-based analysis identifies SUBJECT based on counts of keywords related to certain subjects, e.g., consumer banking, commercial banking, stock trading, automobiles, prescription drugs, real estate, retail, E-commerce, natural resources, customer support, email, animals, investments, and health care.

The language processing algorithm identifies SUBJECT using mathematical and statistics-based algorithms such as natural language processing.

At block 408, for each ASSET, SYSTEM 100 analyzes the ASSET data to determine ASSET PURPOSE. ASSET PURPOSE is a broad reference to the function of the ASSET based on content analysis. For example, an ASSET that contains data indicating it is a blog would have a PURPOSE of blog. An ASSET that contains data indicating it is a web-based email system would have a PURPOSE of web email. An ASSET that contains data indicating it is an online-banking system would have a PURPOSE of on-line banking. An ASSET that contains data indicating it is a remote access system would have a PURPOSE of remote access.

The PURPOSE is determined through one or more algorithms, such as signature-based analysis of the content, language processing algorithms, or other learning algorithms.

At block 412, SYSTEM 100 determines the value at risk or other suitable asset IT security value based on the combination of ASSET PURPOSE and/or ASSET SUBJECT and the ASSET SECURITY CONTROL FEATURES. To facilitate determining the value at risk, SYSTEM 100 assigns value score to ASSET PURPOSE, ASSET SUBJECT, and each of the ASSET SECURITY CONTROL FEATURES. These value score assignments are then combined in to a single value at risk rating using mathematical/heuristic methods. The combined score effectively represents an estimate of the value at risk of a given system/ASSET informed by detected ASSET SECURITY CONTROL FEATURES.

Figure 5A:
FIG. 5A is a flow chart of a method for generating an organizational information technology security assessment.
Figure 5A:
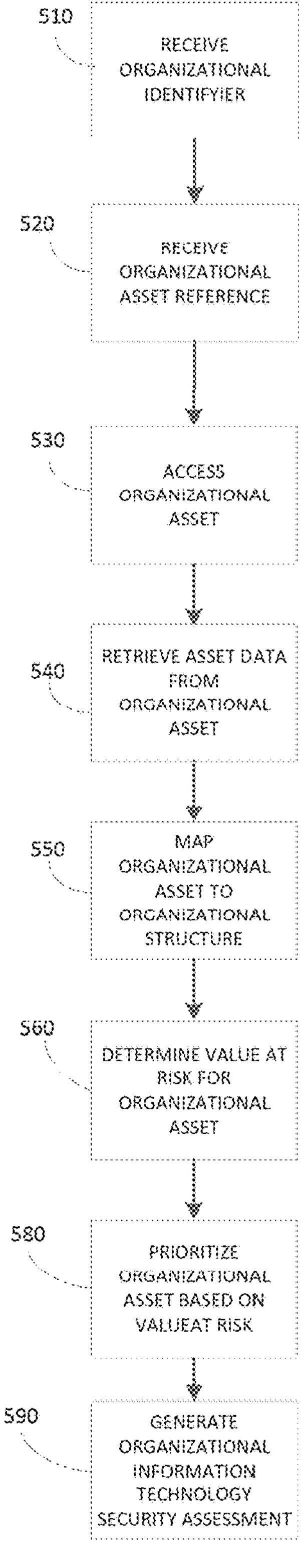

FIG. 5A is a flow chart of an exemplary method 500 for generating an organizational information technology security assessment, according to some embodiments. The method 500 begins with receiving an organizational identifier at block 510, which, in some embodiments, may be input by a user through an input device, or retrieved from a database, or retrieved from a query to a network device or repository, or the like. The organizational identifier guides receipt of organizational asset references, at block 520, and ensures ASSETS accessed, at block 530, belong to the organization being assessed. References to organizational ASSETS received at block 520 may be received through user input, database query, text file input, or the like, and designate at least one organizational information technology asset. The ASSET, as previously described, may be a website, email server, file server, physical device such as a camera, door controller, or the like connected to a communication network such as the internet, a wired or wireless local area network, a Bluetooth® network, or the like.

At block 530, at least one message is sent to the organizational ASSET to establish communication with the ASSET. One or more messages may initially be one or more inquiries to determine the communication protocol used by, or accepted by, the organizational ASSET. Responses from the organizational ASSET may provide information that can be further used to select the communication methods used to retrieve asset data from the organizational ASSET at block 540. Asset data may include content available publically, such as data files, asset configurations, software and software configuration data, hardware and network configuration data, services available through the ASSET, and the like. The asset data retrieved at block 540 may also include host names, domain names, and other computer system identifiers. Asset data retrieved at block 540 may provide key information needed to map the organizational ASSET to an organizational structure and asset type, at block 550. This information may be stored in a database, file repository, or the like, used to determine the organizational asset security value at block 570, or both.

Figure 5B:
FIG. 5B is a flow chart providing further detail for establishing an organizational asset value at risk score.
Figure 5B:
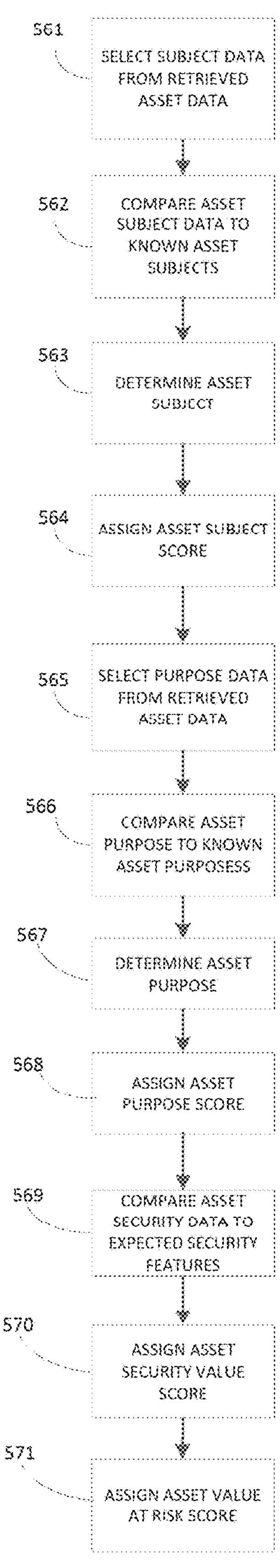

As shown in further detail in FIG. 5B, SYSTEM 100 determines a security value/score for each of a plurality of organizational ASSETS at block 570, using data retrieved from the organizational ASSET. Each organizational ASSET has been deployed to meet an organizational need, purpose or subject of the organizational ASSET. Such subject may be a client help website, a sales website, a blog where clients can exchange information about products and services, a file repository for example products, an employee portal for employment information, and the like. Similarly, each ASSET may have a purpose, such as provide information, allow access to health care information, transact business, and the like. The purpose of an ASSET derives from the functionality the ASSET provides. Some ASSETS also include security information, for example public access, private access through a password, and the like. At a more technical level, ASSETS may only accept specific types of requests routed through specific access points, such as port numbers, which form part of the security information about the organizational ASSET.

At block 580, shown in FIG. 5A, SYSTEM 100 prioritizes organizational ASSETS based on the asset security value/score or "value at risk" determined at block 570. This may be a ranking based on relative asset security values, may be based on actual asset security values calculated on a linear or non-linear scale, or a combination of both types of values. Organizational asset priority determined at block 580 places ASSETS at the highest value at risk higher than those with a lower value at risk, or more valuable ASSETS with security risks higher, or some combination of security risk and value to the organization may be used to prioritize organizational ASSETS. This prioritization affords effective deployment of security control measures and other security resources such as monitoring and updating security protocols.

Figure 5C:
FIG. 5C is a flow chart providing further detail for generating an organizational information technology security assessment from organizational asset value at risk scores.
Figure 5C:
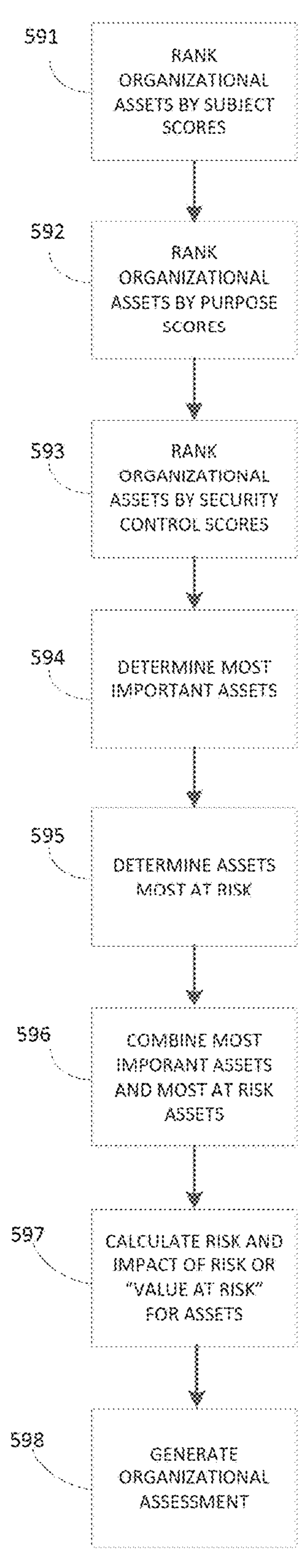
Figure 6:
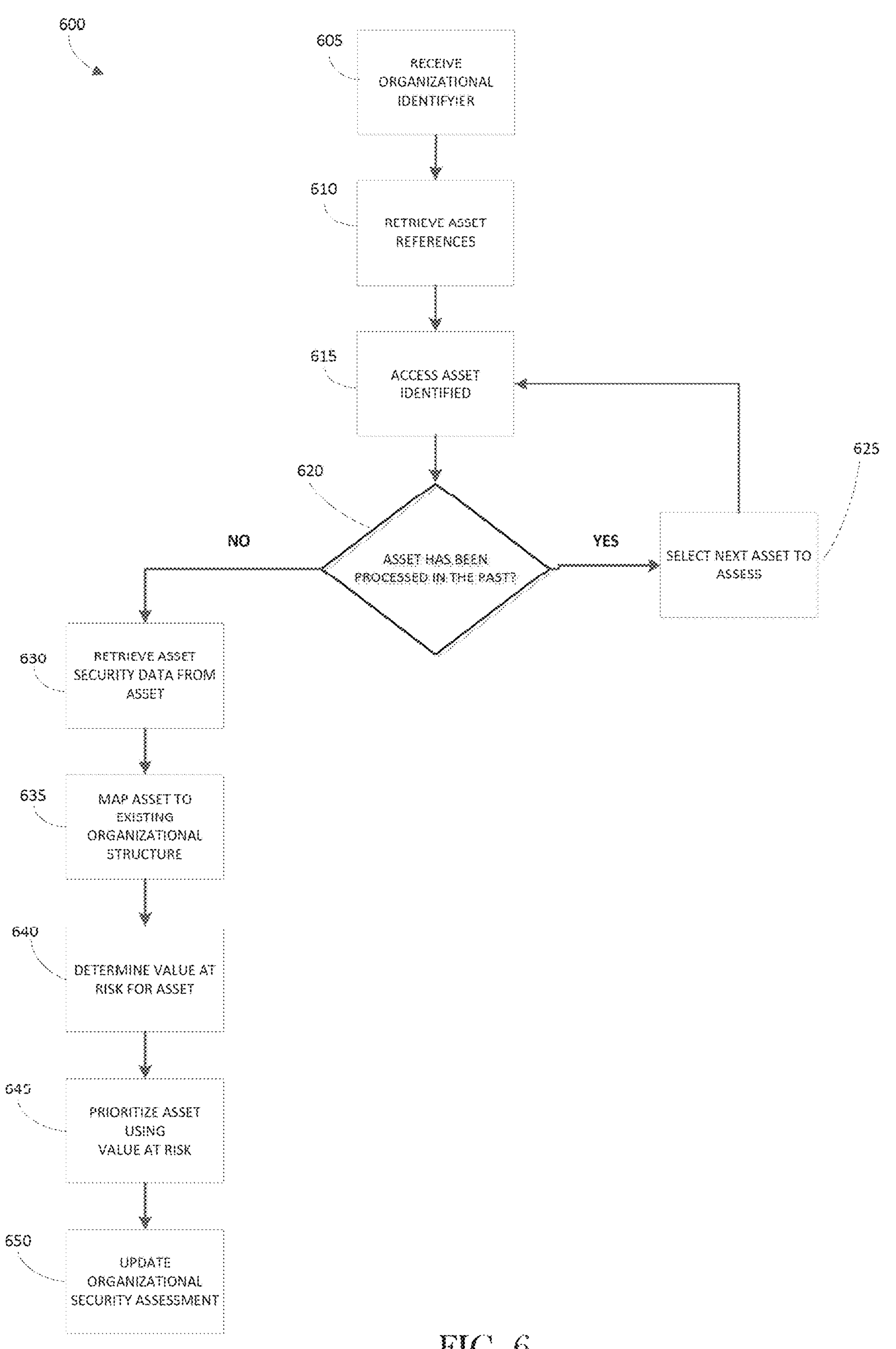
FIG. 6 is a flow chart illustrating a method for monitoring and updating an organizational information technology security assessment.

An organizational information technology security assessment can be generated at block 590, using organizational asset value/scores, one or more prioritized lists of organizational ASSETS, or both, or other means, as further described in FIG. 5C. The organizational information technology security assessment provides an organization with information about individual organizational ASSETS as well as an overall assessment of the organization's information technology infrastructure. The organization can use this assessment, for example, to determine where to spend resources on security upgrades, redeployment of ASSETS, and the like. In addition, organizational information technology infrastructure tends to change over time thus requiring the infrastructure be monitored for security issues. FIG. 6 shows a flow chart of a method that monitors an organization's information technology infrastructure through an iterative process.

FIG. 5B illustrates in further detail one embodiment of a method for determining the value at risk/security score for an organizational ASSET. As described previously, data retrieved from an organizational ASSET, at block 540 in FIG. 5A, includes a variety of information, including data describing the ASSET, like, for example, the title of a webpage or blog, which is specified in text. The subject of the ASSET, describing what the ASSET is, is extracted using natural language processing or keyword search, or another text analysis method, at block 561 in FIG. 5B. for example, a webpage with the title "Employee Benefits Portal" can be parsed to extract each word as a token, and the tokens compared to a dictionary of known asset subjects, at block 562, to determine the subject of the webpage is "employee benefits" at block 563. The "employee benefits" subject may also include a webpage entitled "Employee Retirement Benefits" or the like.

Once the asset subject has been determined at block 563, the asset subject score can be assigned from a predefined list of subjects at block 564 based on, for example, critically to the organization or impact of a data breach. For example, an ASSET that provides information about how to assemble an organization's products (i.e., bicycles or furniture) may be assigned a low asset subject score because such an ASSET is not critical to operation of the organization or due to the low impact of a data breach on this ASSET. Conversely, an ASSET with the subject "employee benefits" would have a higher value score because compromise of the ASSET could lead to incorrect information being distributed to employees at the key time they are to make benefits decisions, or worse, allow unauthorized access to personal enrollment information. The asset subject score could be a ranking on an ordinal scale, or be selected from a linear or non-linear scale, or some combination of both to assign a score to the asset subject.

Similar to determining the asset subject, the type of ASSET and functionality exposed by the ASSET can be selected from the asset data at block 565, using natural language understanding or keyword searching, or the like, to determine the asset purpose. The type of asset and functionality exposed, for example, can be compared to known purposes of ASSETS at block 566. For example, the "Employee Benefits Portal" previously discussed, may be a webpage that allows employees to log in and retrieve their personal benefits information, make changes to elected benefits, and save the changes to the organizational database. Such an asset purpose then would to allow employees to access and change financial and personal information, or more succinctly, the ASSET has the purpose of accessing and changing financial and personal information. An ASSET with the purpose of changing private and sensitive information would be assigned a relatively high asset purpose score due to the high impact of a breach or intrusion into the ASSET. Sensitive information may include personally identifiable user information, financial account information, proprietary corporate information, and the like. Assigning an asset purpose score at block 568 takes into account the criticality, impact of a security breach, and the like when assigning an asset purpose score. Again, the score could be an ordinal ranking, or be selected from a linear or non-linear scale, or some combination of both to assign a score to the asset purpose.

Asset security data can be more directly compared to expected security control features at block 569 because asset security data can be directly obtained and conforms to standards as to access methods, for example FTTP, connection specifications, for example through only a specific port, the presence or absence of encryption, and authentication methods, software and system versions, and the like. The presence and absence of security features as well as the type of security features present can be combined using heuristics, weighted factors, probability of data breach, and the like to obtain values that can be combined to assign a value at risk score for the ASSET at block 570. For example, if all ports are available for communication, the score for this factor could indicate a less secure ASSET, while the requirement of encryption might receive a score indicating that encryption increases security. Combining assigned value at risk scores for different sensitive/security data produces an asset value at risk score that can be combined with or otherwise used to assign the ASSET an overall value at risk score. Heuristics, probabilities, weighted averages, or algorithms assessing the impact of each value score on the other scores, for example, can be used to assign asset value at risk scores at block 571. For example, asset scores can be weighted, have thresholds, or serve as a factor in scoring. In one example, if the asset value at risk score was high due to an out-of-date authentication method or software more than three versions out of date, an overall asset value at risk score could be assigned a high value to reflect this overwhelming threat.

As described in further detail in FIG. 5C, an organizational assessment may be generated utilizing asset value at risk scores, as illustrated in the example embodiment of FIG. 5B. At block 591, organizational ASSETS can be rank ordered, for example, by subject scores, separately rank ordered by purpose scores at block 592, and again separately rank ordered by security control scores at block 593. With these rankings, the most important, most valuable, most critical, and/or most risky, ASSETS can be determined by, for example, adding together rankings from both lists where the higher the ranking the more important the asset. Other methods can also be used, for example statistical methods to determine the population distribution, normalization, randomness, and other approaches. Similarly, the ranking of organizational ASSETS at risk weighs specific security risks higher than others, apply heuristics or statistical methods, or other methods to rank order ASSETS based on security risk. Combining the sensitivity/importance and security risk rankings, at block 596, produces one or more lists of ASSETS' values at risk.

At block 597, in this example embodiment, SYSTEM 100 executing the method shown in FIG. 5C calculates the sensitivity/importance and potential impact of each security breach risk for each organizational ASSET. This calculation, for example, may calculate a high security breach risk for an ASSET such as an information website that his relatively small sensitivity/importance to the organization. Conversely, the security breach risk for a secured employee benefits portal may be small but the impact high due to this asset's relative sensitivity/importance. An organization may find any risk to such an important asset unacceptable. These sensitivity, risk and impact of risk calculations may be used to generate an organizational information technology security assessment at block 598. It should be recognized that different organizations view risk differently, and view the importance of assets differently, and thus an assessment outlining risks and impacts, and ASSETS with high risk and others with high impact, for one organization can be viewed differently by another organization. The assessment can be tailored to an organization by revising heuristics, weighting of risks and asset importance value scores, and the like. It should also be recognized the systems and methods here can be used across a wide range of organizations and asset types to assess risk in specific ways requested by an organization. It should be further recognized that the example methods described herein are not limiting of the methods but instead example embodiments of organizational information technology security assessment methods.

The example method illustrated in FIG. 5A can be executed by SYSTEM 100 to perform organizational infrastructure assessment, as previously described. In addition, as shown in FIG. 6, method 600 is an example embodiment of a method executed on SYSTEM 100 to monitor an organization's information technology security systems and update the organizational information technology security assessment. Method 600 receives an organizational identifier at block 605 from, for example, a user through an input device, from a database, a text file, a query, or the like. The organizational identifier is used to retrieve asset references, at block 610, stored during or after at least one previously executed organizational information technology assessment, as described in FIG. 5A. SYSTEM 100 executing method 600 accesses an organizational ASSET to retrieve asset data at block 615. Using data retrieved from the organizational ASSET, system 600 compares retrieved asset data, for example the asset identifier as an IP address or asset title, to stored asset data to determine if the ASSET has been processed previously at decision block 620. If the ASSET has not been processed previously, or the ASSET has changed significantly and as such becomes a different ASSET (for example, changing a file server to a web server), the asset security data is retrieved from the ASSET at block 630.

As previously described, the organizational ASSET is mapped to an organizational infrastructure and asset type, at block 635, using similar methods as shown in FIG. 5A and described at block 550. Similarly, the organizational value at risk score is determined at block 640, as described in FIG. 5B at blocks 561-571, and the organizational ASSET is prioritized and added to the priority lists at block 645, as described in FIG. 5A at block 580. To update the organizational security assessment at block 650, the current organizational security assessment and asset data from a plurality of other asset information assessed by SYSTEM 100 previously are received from storage, for example a database or file repository. At block 650, the organizational security assessment is updated by integrating the asset value at risk score of the previously unassessed ASSET, determined at block 640 and prioritized at 645, with the asset value at risk scores of previously assessed ASSETS to produce an updated organizational security assessment, using steps previously described in FIG. 5C.

Lastly, if the organizational ASSET has been assessed in the past, determined at decision block 620, the next asset reference is selected at block 625 and the ASSET is then accessed at block 625. It should be recognized that method 600 is an example embodiment and that the method could be executed by accumulating all asset value risk scores and then updating the organizational security assessment, or, all ASSETS could be re-assessed and the organizational security assessment updated periodically, or the ASSETS could be scanned periodically and when a specific number of ASSETS had changed, the organizational security assessment updated, or some or all of the previous approaches used together, or another similar method used. It should also be recognized that the systems and methods described here combine security data from organizational ASSETS with asset subject and asset purpose to provide a more complete and more accurate security assessment for organizations, one that can be used to make better decisions based on data sensitivity, security risks and security impacts.

Some embodiments described herein may be encoded in a non-transitory machine-readable medium having or using instructions, which may be executed in a computer system (or other electronic device(s) such as a digital processor) to perform a method in accordance with some embodiments of the present invention. In general, a machine-readable medium can include any mechanism for encoding information in a form (e.g., software, source or object code, functionally descriptive information, etc.) readable by a machine (e.g., a computer) including tangible storage incident to transmission of the information. A machine-readable medium may include, but is not limited to, magnetic storage medium (e.g., disks and/or tape storage); optical storage medium (e.g., CD-ROM, DVD, etc.); magneto-optical storage medium; read only memory (ROM); random access memory (RAM); erasable programmable memory (e.g., EPROM and EEPROM); flash memory; or other types of medium suitable for storing electronic instructions, operation sequences, functionally descriptive information encodings, etc.

In general, plural instances may be provided for components, operations, or structures described herein as a single instance, or vice versa. Boundaries between various components, operations, and data stores are somewhat arbitrary, and particular operations are illustrated in the context of specific illustrative configurations. Other allocations of functionality are envisioned and may fall within the scope of the invention(s).

Those skilled in the art will appreciate that embodiments described in the foregoing may be practiced in conjunction with any number of data transmission protocols and that the systems described herein are merely one exemplary application for the invention.

Various features and advantages of the invention are set forth in the following claims.

We claim:

1. A method for automatically estimating respective values at risk for network computer systems/assets, the method comprising:

receiving, by an electronic processor, a network identifier associated with a network-accessible computer system/asset of an organization;

predicting, by the electronic processor, whether a domain is owned by the organization, the prediction returning a numeric ownership guess score, by:

generating a domain record comprising a data record of domain attributes that is a representation of a public domain registration record for the domain;

comparing attributes of the domain record with attributes of domain records for which ownership was already decided, including domain records previously flagged as related to the organization and domain records previously flagged as not related to the organization;

increasing the numeric ownership guess score when one or more of the compared attributes of the domain record have values that match corresponding attributes of one or more of the domain records previously flagged as related to the organization; and decreasing the numeric ownership guess score when one or more of the compared attributes of the domain record have values that match corresponding attributes of one or more of the domain records previously flagged as not related to the organization;

accessing, via a network, the network-accessible computer system/asset and a plurality of related network-accessible computer systems/assets, by:

sending, via a network interface to the network, at least one message to each of the network-accessible computer system/asset and the plurality of related network-accessible computer systems/assets to establish communication, wherein the at least one message includes one or more inquiries to determine a communication protocol used by each of the network-accessible computer system/asset and the plurality of related network-accessible computer systems/assets, receiving, from each of the network-accessible computer system/asset and the plurality of related network-accessible computer systems/assets, one or more responses to the one or more inquiries, the one or more responses providing information usable to select communication methods, transmitting, via the network interface to the network, one or more protocol-specific requests to each of the network-accessible computer systems/asset and the plurality of related network-accessible computer systems/assets, based on the information usable to select communication methods, and automatically receiving one or more responses comprising one or more of the following: HTTP headers, HTML, JavaScript, cookies, DNS records, and encryption certificates and configurations;

determining indicia of content features/characteristics for each of the network-accessible computer system/asset and the plurality of related network-accessible computer systems/assets, by analyzing each of the one or more responses using one or more of the following: machine learning models, regular expressions, text string matching, natural-language understanding, image processing, and text analysis;

determining indicia of security features/characteristics of each of the network-accessible computer system/asset and the plurality of related network-accessible computer systems/assets, including detecting one or more of the following: encryption, login field, captcha, security feature code, security-related keywords, security feature configurations, password field, security question, user authentication, secure cookies, two-factor authentication, RSA fraud protection, software bot detection, and secure connection protocols;

determining network proximity between respective ones of the network-accessible computer system/asset and the plurality of related network-accessible computer systems/assets; and inferring a value at risk for each of the network-accessible computer system/asset and the plurality of related network-accessible computer systems/assets based on, for a respective network-accessible computer system/asset, the indicia of content features/characteristics and the indicia of security features/characteristics, and based on network proximity to other network-accessible computer systems/assets with at least one of similar indicia of content features/characteristics, similar indicia of security features/characteristics, and similar values at risk.

2. The method of claim 1, further comprising ranking the network-accessible computer system/asset for allocation of security of measures relative to the plurality of related network-accessible computer systems/assets based on respective values at risk.

3. The method of claim 1, wherein the indicia of content features/characteristics include one or more of the following:

presence of predetermined text, content subject matter, purpose of content accessible via the network-accessible computer system/asset, purpose of content requested via the network-accessible computer system/asset, functionality of content, presence of sensitive data, collection of the sensitive data, and presence of user-identifiable account data.

4. The method of claim 3, wherein at least one of the content subject matter and the purpose of the content includes one or more of the following:

publicly available information, account data, financial account data, personally-identifiable data, personal health record data, internal corporate data, privacy regulated data, sensitive organizational data, and sensitive user data.

5. The method of claim 1, wherein the value at risk represents both a measure of value and risk for any data or functionality, which if accessed by an unauthorized agent, including a person, computer program, or mechanical bot, if used in an unauthorized manner, or if availability or performance characteristics of functionality is degraded, the organization would be exposed to violation of regulations, financial liability, operational disruption of related processes resulting from unavailability or degraded performance of the functionality, harm of reputation, legal liability, or to violation of customer agreements.

6. A non-transitory computer-readable medium having computer-executable instructions stored thereon, the computer-executable instructions, when executed by a processor, causing the processor to:

receive a network identifier associated with a network-accessible computer system/asset of an organization;

predict whether a domain is owned by the organization, the prediction returning a numeric ownership guess score, by:

generating a domain record comprising a data record of domain attributes that is a representation of a public domain registration record for the domain, comparing attributes of the domain record with attributes of domain records for which ownership was already decided, including domain records previously flagged as related to the organization and domain records previously flagged as not related to the organization, increasing the numeric ownership guess score when one or more of the compared attributes of the domain record have values that match corresponding attributes of one or more domain records previously flagged as related to the organization, and decreasing the numeric ownership guess score when one or more of the compared attributes of the domain record have values that match corresponding attributes of one or more domain records previously flagged as not related to the organization;

access, via a network, the network-accessible computer system/asset and a plurality of related network-accessible computer systems/assets, by sending, via a network interface to the network, at least one message to each of the network-accessible computer system/asset and the plurality of related network-accessible computer systems/assets to establish communication, wherein the at least one message includes one or more inquiries to determine a communication protocol used by each of the network-accessible computer system/asset and the plurality of related network-accessible computer systems/assets, receiving, from each of the network-accessible computer system/asset and the plurality of related network-accessible computer systems/assets, one or more responses to the one or more inquiries, the one or more responses providing information usable to select communication methods, transmitting, via the network interface to the network, one or more protocol-specific requests to each of the network-accessible computer systems/asset and the plurality of related network-accessible computer systems/assets, based on the information usable to select communication methods, and automatically receiving one or more responses comprising one or more of the following: HTTP headers, HTML, JavaScript, cookies, DNS records, and encryption certificates and configurations;

determine indicia of content features/characteristics for each of the network-accessible computer system/asset and the plurality of related network-accessible computer systems/assets, by analyzing each of the one or more responses using one or more of the following: machine learning models, regular expressions, text string matching, natural-language understanding, image processing, and text analysis;

determine indicia of security features/characteristics of each of the network-accessible computer system/asset and the plurality of related network-accessible computer systems/assets, including detecting one or more of the following: encryption, login field, captcha, security feature code, security-related keywords, security feature configurations, password field, security question, user authentication, secure cookies, two-factor authentication, RSA fraud protection, software bot detection, and secure connection protocols;

determine network proximity between respective ones of the network-accessible computer system/asset and the plurality of related network-accessible computer systems/assets; and infer a value at risk for each of the network-accessible computer system/asset and the plurality of related network-accessible computer systems/assets based on, for a respective network-accessible computer system/asset, the indicia of content features/characteristics and the indicia of security features/characteristics, and based on network proximity to other network-accessible computer systems/assets with at least one of similar indicia of content features/characteristics, similar indicia of security features/characteristics, and similar values at risk.

7. The non-transitory computer-readable medium of claim 6, the computer-executable instructions further causing the processor to rank the network-accessible computer system/asset for allocation of security of measures relative to the plurality of related network-accessible computer systems/assets based on respective values at risk.

8. The non-transitory computer-readable medium of claim 6, wherein the indicia of content features/characteristics include one or more of the following:

presence of predetermined text, content subject matter, purpose of content accessible via the network-accessible computer system/asset, purpose of content requested via the network-accessible computer system/asset, functionality of content, presence of sensitive data, collection of the sensitive data, and presence of user-identifiable account data.

9. The non-transitory computer-readable medium of claim 8, wherein at least one of the content subject matter and the purpose of the content includes one or more of the following:

publicly available information, account data, financial account data, personally-identifiable data, personal health record data, internal corporate data, privacy regulated data, sensitive organizational data, and sensitive user data.

10. The non-transitory computer-readable medium of claim 6, wherein the value at risk represents both a measure of value and risk for any data or functionality, which if accessed by an unauthorized agent, including a person, computer program, or mechanical bot, if used in an unauthorized manner, or if availability or performance characteristics of functionality is degraded, the organization would be exposed to violation of regulations, financial liability, operational disruption of related processes resulting from unavailability or degraded performance of the functionality, harm of reputation, legal liability, or to violation of customer agreements.

11. A system comprising:

a processor; and a memory device having computer-executable instructions stored thereon, the computer-executable instructions, when executed by the processor, cause the processor to:

receive a network identifier associated with a network-accessible computer system/asset of an organization;

predict whether a domain is owned by the organization, the prediction returning a numeric ownership guess score, by:

generating a domain record comprising a data record of domain attributes that is a representation of a public domain registration record for the domain, comparing attributes of the domain record with attributes of domain records for which ownership was already decided, including domain records previously flagged as related to the organization and domain records previously flagged as not related to the organization, increasing the numeric ownership guess score when one or more of the compared attributes of the domain record have values that match corresponding attributes of one or more domain records previously flagged as related to the organization, and decreasing the numeric ownership guess score when one or more of the compared attributes of the domain record have values that match corresponding attributes of one or more domain records previously flagged as not related to the organization, access, via a network, the network-accessible computer system/asset and a plurality of related network-accessible computer systems/assets, by:

sending, via a network interface to the network, at least one message to each of the network-accessible computer system/asset and the plurality of related network-accessible computer systems/assets to establish communication, wherein the at least one message includes one or more inquiries to determine a communication protocol used by each of the network-accessible computer system/asset and the plurality of related network-accessible computer systems/assets, receiving, from each of the network-accessible computer system/asset and the plurality of related network-accessible computer systems/assets, one or more responses to the one or more inquiries, the one or more responses providing information usable to select communication methods, transmitting, via the network interface to the network, one or more protocol-specific requests to each of the network-accessible computer systems/asset and the plurality of related network-accessible computer systems/assets, based on the information usable to select communication methods, and automatically receiving one or more responses comprising one or more of the following: HTTP headers, HTML, JavaScript, cookies, DNS records, and encryption certificates and configurations;

determine indicia of content features/characteristics for each of the network-accessible computer systems/assets, by analyzing each of the one or more responses using one or more of the following: machine learning models, regular expressions, text string matching, natural-language understanding, image processing, and text analysis;

determine indicia of security features/characteristics of each of the network-accessible computer systems/assets, including detecting one or more of the following: encryption, login field, captcha, security feature code, security-related keywords, security feature configurations, password field, security question, user authentication, secure cookies, two-factor authentication, RSA fraud protection, software bot detection, and secure connection protocols;

determine network proximity between respective network-accessible computer systems/assets; and infer a value at risk for each of the network-accessible computer systems/assets based on, for a respective network-accessible computer system/asset, the indicia of content features/characteristics and the indicia of security features/characteristics, and based on network proximity to other network-accessible computer systems/assets with at least one of similar indicia of content features/characteristics, similar indicia of security features/characteristics, and similar values at risk.

12. The system of claim 11, the computer-executable instructions further causing the processor to rank the network-accessible computer system/asset for allocation of security of measures relative to the plurality of related network-accessible computer systems/assets based on respective values at risk.

13. The system of claim 11, wherein the indicia of content features/characteristics include one or more of the following:

presence of predetermined text, content subject matter, purpose of content accessible via the network-accessible computer system/asset, purpose of content requested via the network-accessible computer system/asset, functionality of content, presence of sensitive data, collection of the sensitive data, and presence of user-identifiable account data.

14. The system of claim 11, wherein the value at risk represents both a measure of value and risk for any data or functionality, which if accessed by an unauthorized agent, including a person, computer program, or mechanical bot, if used in an unauthorized manner, or if availability or performance characteristics of functionality is degraded, the organization would be exposed to violation of regulations, financial liability, operational disruption of related processes resulting from unavailability or degraded performance of the functionality, harm of reputation, legal liability, or to violation of customer agreements.

* * * * *